(12) United States Patent
Jayaraman

(10) Patent No.: US 11,651,032 B2
(45) Date of Patent: May 16, 2023

(54) DETERMINING SEMANTIC CONTENT OF TEXTUAL CLUSTERS

(71) Applicant: ServiceNow, Inc., Santa Clara, CA (US)

(72) Inventor: Baskar Jayaraman, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 447 days.

(21) Appl. No.: 16/711,123

(22) Filed: Dec. 11, 2019

(65) Prior Publication Data

US 2020/0349199 A1 Nov. 5, 2020

Related U.S. Application Data

(63) Continuation-in-part of application No. 16/434,888, filed on Jun. 7, 2019.

(60) Provisional application No. 62/843,007, filed on May 3, 2019.

(51) Int. Cl.
| | | |
|---|---|---|
| *G06F 17/00* | (2019.01) | |
| *G06F 16/9032* | (2019.01) | |
| *G06N 20/00* | (2019.01) | |
| *G06F 40/49* | (2020.01) | |
| *G06F 40/30* | (2020.01) | |
| *G06F 16/906* | (2019.01) | |

(52) U.S. Cl.
CPC ...... *G06F 16/90332* (2019.01); *G06F 16/906* (2019.01); *G06F 40/30* (2020.01); *G06F 40/49* (2020.01); *G06N 20/00* (2019.01)

(58) Field of Classification Search
CPC .. G06F 16/90332; G06F 16/906; G06F 40/30; G06F 40/49; G06F 21/554; G06F 16/2465; G06F 21/552; G06F 16/30; G06F 16/5838; G06N 20/00
USPC .......................................................... 706/12
See application file for complete search history.

(56) References Cited

U.S. PATENT DOCUMENTS

| | | |
|---|---|---|
| 3,674,992 A | 7/1972 | Kirkham |
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |

(Continued)

FOREIGN PATENT DOCUMENTS

EP 3462387 A1 4/2019

OTHER PUBLICATIONS

International Search Report and Written Opinion for PCT Application No. PCT/US2020/031173 dated Jul. 16, 2020; 12 pgs.

(Continued)

*Primary Examiner* — Jason T Edwards
(74) *Attorney, Agent, or Firm* — Fletcher Yoder PC

(57) ABSTRACT

The embodiments herein provide a framework for and specific implementations of machine learning (ML) analysis of incident, online chat, knowledgebase, skills, and perhaps other types of databases. The ML techniques described herein may include various forms of semantic analysis of textual information in these databases, such as clustering, term frequency, word embedding, paragraph embedding, and potentially other techniques. Advantageously, use of ML in the specific ways described herein can provide insights into this textual information that otherwise would be impossible to determine in an accurate or concise fashion.

20 Claims, 26 Drawing Sheets

(56) References Cited

U.S. PATENT DOCUMENTS

| | | | |
|---|---|---|---|
| 7,131,037 B1 | 10/2006 | LeFaive | |
| 7,170,864 B2 | 1/2007 | Matharu | |
| 7,219,085 B2 | 5/2007 | Buck et al. | |
| 7,251,637 B1* | 7/2007 | Caid | G06V 10/451 706/26 |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidar | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,280,739 B2 | 3/2016 | Jayaraman et al. | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Meuller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 9,916,383 B1* | 3/2018 | Ching | G06F 16/93 |
| 10,462,170 B1* | 10/2019 | Wang | H04L 63/1416 |
| 10,803,399 B1* | 10/2020 | Cohen | G06F 16/93 |
| 2002/0099730 A1* | 7/2002 | Brown | G06F 16/30 707/E17.058 |
| 2003/0020749 A1* | 1/2003 | Abu-Hakima | G06Q 10/10 715/752 |
| 2008/0082968 A1 | 4/2008 | Chang et al. | |
| 2008/0205774 A1* | 8/2008 | Brinker | G06F 16/353 382/225 |
| 2011/0087668 A1* | 4/2011 | Thomas | G06F 16/355 707/738 |
| 2013/0124525 A1 | 5/2013 | Anderson et al. | |
| 2017/0124458 A1 | 5/2017 | Jayaraman et al. | |
| 2017/0124459 A1 | 5/2017 | Jayaraman et al. | |
| 2017/0243112 A1 | 8/2017 | Ekambaram et al. | |
| 2017/0277736 A1* | 9/2017 | Sharma | G06F 16/353 |
| 2017/0293625 A1 | 10/2017 | Nachlieli et al. | |
| 2018/0107920 A1 | 4/2018 | Jayaraman et al. | |
| 2018/0196873 A1* | 7/2018 | Yerebakan | G06F 16/35 |
| 2018/0330455 A1* | 11/2018 | Bayyapu | G06Q 50/18 |
| 2018/0349388 A1* | 12/2018 | Skiles | G06N 20/10 |
| 2020/0302018 A1* | 9/2020 | Turkkan | G06F 16/3347 |

OTHER PUBLICATIONS

Hassan Sajjad and Helmut Schmid, "Tagging Urdu Text with Parts of Speech: A Tagger Comparison", Proceedings of the 12th Conference of the European Chapterof the ACL, 2009, pp. 692-700.

Neha Agarwal et al., "Sentence Boundary Detection Using a MaxEnt Classifier", Proceedings of the 12th Conference of MISC, 2005, pp. 1-6.

Qingyao Ai, Liu Yang, Jiafeng Guo, W. Bruce Croft, Analysis of the Paragraph Vector Model for Information Retrieval, Proceedings of the 2016 ACM International Conference on the Theory of Information Retrieval, Sep. 12, 2016.

Quoc Le, Tomas Mikolov, Distributed Representations of Sentences and Documents, Proceedings of the 31st International Conference on Machine Learning, Beijing, China, 2014.

Vector Representations of Words, https://www.tensorflow.org/tutorials/word2vec (downloaded from public Internet site Jan. 21, 2018).

Tomas Mikolov, Ilya Sutskever, Kai Chen, Greg Corrado, Jeffrey Dean, Distributed Representations of Words and Phrases and their Compositionality, NIPS'13 Proceedings of the 26th International Conference on Neural Information Processing Systems, Dec. 2013.

Andrew M. Dai, Christopher Olah, Quoc V. Le, Document Embedding with Paragraph Vectors, preprint, Jul. 2015.

A Gentle Introduction to Doc2Vec, https://medium.com/scaleabout/a-gentle-introduction-to-doc2vec-db3e8c0cce5e (downloaded from public Internet site Sep. 18, 2018).

How Does Doc2Vec Represent Feature Vector of a Document?, https://www.quora.com/How-does-doc2vec-represent-feature-vector-of-a-document-Can-anyone-explain-mathematically-how-the-process-is-done (downloaded from public Internet site Sep. 18, 2018).

Examination Report for AU Patent Application No. 2020270417 dated Oct. 24, 2022 (3 pgs).

* cited by examiner

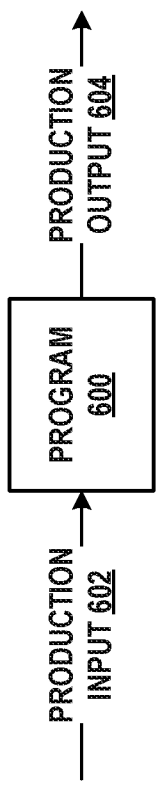
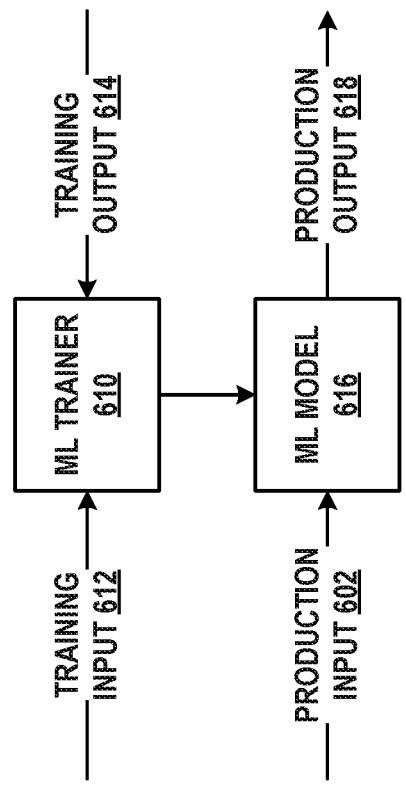
FIG. 6A
FIG. 6B

700

| ORIGINATOR | BOB SMITH | ← 702 |
| --- | --- | --- |
| CREATED | 2018-02-07 9:56AM | ← 704 |
| SHORT DESCRIPTION | CAN'T CONNECT TO EMAIL | ← 705 |
| PROBLEM DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | ← 706 |
| CATEGORY | EMAIL | ← 708 |
| ASSIGNED TO | ALICE JONES | ← 710 |
| STATUS | RESOLVED | ← 712 |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | ← 714 |
| RESOLVED TIME | 2018-02-07 10:10AM | ← 716 |
| CLOSURE CODE | SOLVED (PERMANENTLY) | ← 718 |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? | ← 720 |
| LINK TO KNOWLEDGEBASE | ITKB/WIRELESS/CONFIGURATION.HTML | ← 722 |

FIG. 7A

| SENDER | RECIPIENT | TIME | CONTENT |
|---|---|---|---|
| ALICE | BOB | 2019-08-11:09:23:05 | HI, I WOULD LIKE TO ORDER A NEW LAPTOP |
| BOB | ALICE | 2019-08-11:09:23:12 | THANKS FOR YOUR REQUEST, ALICE! I WILL BE HAPPY TO HELP YOU ORDER A NEW LAPTOP. DO YOU WISH TO STAY WITH YOUR CURRENT OPERATING SYSTEM OR TRY A NEW ONE? |
| ALICE | BOB | 2019-08-11:09:35:51 | I THINK I'D PREFER TO STAY WITH WINDOWS |
| BOB | ALICE | 2019-08-11:09:36:10 | OK, SOUNDS GOOD. WE HAVE THREE OPTIONS IN TERMS OF SCREEN SIZE AND MEMORY: 13" WITH 4GB OF RAM, 15" WITH 6GB OF RAM, AND 17" WITH 8GB OF RAM. |
| ALICE | BOB | 2019-08-11:09:38:27 | I'LL TAKE THE MIDDLE OPTION |
| BOB | ALICE | 2019-08-11:09:38:34 | GREAT! WE WILL PROCURE A NEW WINDOWS LAPTOP WITH A 15" SCREEN AND 6GB, AND WILL SHIP IT TO YOUR LOCATION TOMORROW. |

FIG. 7B

1170 — SELECT A SUBSET OF INCIDENT REPORTS THAT ARE ASSOCIATED WITH DATES WITHIN A PRE-DETERMINED WINDOW OF TIME, WHEREIN A DATABASE CONTAINS THE INCIDENT REPORTS AND A KNOWLEDGEBASE, WHEREIN THE INCIDENT REPORTS INCLUDE TEXT-BASED FIELDS THAT DOCUMENT TECHNOLOGY-RELATED PROBLEMS EXPERIENCED BY USERS OF A MANAGED NETWORK, AND WHEREIN THE KNOWLEDGEBASE CONTAINS ARTICLES TEXTUALLY DESCRIBING A SUBSET OF THE TECHNOLOGY-RELATED PROBLEMS

↓

1172 — DETERMINE VECTOR REPRESENTATIONS FOR EACH OF THE SUBSET OF THE INCIDENT REPORTS, WHEREIN THE VECTOR REPRESENTATIONS CHARACTERIZE THE INCIDENT REPORTS IN A P-DIMENSIONAL SEMANTIC SPACE

↓

1174 — CALCULATE SIMILARITY METRICS BETWEEN THE VECTOR REPRESENTATIONS AND FURTHER VECTOR REPRESENTATIONS THAT CHARACTERIZE THE ARTICLES IN THE P-DIMENSIONAL SEMANTIC SPACE

↓

1176 — DETERMINE, BASED ON THE SIMILARITY METRICS, THAT A PARTICULAR ARTICLE OF THE ARTICLES HAS LESS THAN A FIRST THRESHOLD SEMANTIC SIMILARITY WITH THE SUBSET OF THE INCIDENT REPORTS

↓

1178 — PROVIDE AN INDICATION THAT THE PARTICULAR ARTICLE IS A CANDIDATE FOR REMOVAL FROM THE KNOWLEDGEBASE

FIG. 11E

```
┌─────────────────────────────────────────────────────────────────┐
│ DETERMINE MAPPINGS (I) FROM TEXT-BASED FIELDS FOR EACH OF A    │
│ PLURALITY OF INCIDENT REPORTS TO INCIDENT VECTORS IN A P-DIMENSIONAL │
│ SEMANTIC SPACE, AND (II) FROM TEXT-BASED DESCRIPTIONS FOR EACH OF A │
│ PLURALITY OF SKILL DEFINITIONS TO SKILL VECTORS IN THE P-DIMENSIONAL │  ← 1250
│ SEMANTIC SPACE, WHEREIN THE TEXT-BASED FIELDS DOCUMENT          │
│ TECHNOLOGY-RELATED PROBLEMS EXPERIENCED BY USERS OF A MANAGED  │
│ NETWORK, AND WHEREIN THE TEXT-BASED DESCRIPTIONS ARE OF SKILLS │
│ THAT CAN BE USED TO ADDRESS AT LEAST SOME OF THE TECHNOLOGY-   │
│ RELATED PROBLEMS                                                │
└─────────────────────────────────────────────────────────────────┘
                                  │
                                  ▼
┌─────────────────────────────────────────────────────────────────┐
│ PERFORM A COMPARISON, USING A SIMILARITY METRIC, OF THE INCIDENT│  ← 1252
│               VECTORS TO THE SKILL VECTORS                      │
└─────────────────────────────────────────────────────────────────┘
                                  │
                                  ▼
┌─────────────────────────────────────────────────────────────────┐
│ BASED ON THE COMPARISON, IDENTIFY, FOR EACH OF THE INCIDENT     │
│ REPORTS, A SET OF THE SKILL DEFINITIONS THAT ARE MOST SIMILAR   │  ← 1254
│                         THERETO                                 │
└─────────────────────────────────────────────────────────────────┘
                                  │
                                  ▼
┌─────────────────────────────────────────────────────────────────┐
│ PROVIDE, FOR EACH RESPECTIVE INCIDENT REPORT OF THE INCIDENT    │
│ REPORTS, THE SET OF THE SKILL DEFINITIONS THAT ARE MOST SIMILAR │  ← 1256
│ THERETO AS RECOMMENDED SKILLS THAT CAN BE USED TO ADDRESS THE   │
│ TECHNOLOGY-RELATED PROBLEMS DOCUMENTED IN THE RESPECTIVE        │
│                       INCIDENT REPORT                           │
└─────────────────────────────────────────────────────────────────┘
```

FIG. 12D

DETERMINING SEMANTIC CONTENT OF TEXTUAL CLUSTERS

CROSS-REFERENCE TO RELATED APPLICATIONS

This application is a continuation-in-part of and claims priority to U.S. patent application Ser. No. 16/434,888, filed Jun. 7, 2019, which is hereby incorporated by reference in its entirety.

U.S. patent application Ser. No. 16/434,888 claims priority to U.S. Non-Provisional Pat. App. No. 62/843,007, filed May 3, 2019, which is hereby incorporated by reference in its entirety.

BACKGROUND

An enterprise may outsource certain aspects of its network and security operations to a cloud-based remote network management platform. This platform may include one or more computational instances with computing resources dedicated or partially dedicated to the enterprise. By way of web-based or other interfaces, the enterprise may interact with information in incident, online chat, knowledgebase, and skills databases. But as the enterprise grows, these databases may increase in size accordingly. Thus, it may be beyond the capabilities of conventional tools to find correlations and interactions in information within one such database or between more than one of these databases.

SUMMARY

The embodiments herein provide a framework for and specific implementations of machine learning (ML) analysis of incident, online chat, knowledgebase, skills, and perhaps other types of databases. The ML techniques described herein may include various forms of semantic analysis of textual information in these databases, such as clustering, term frequency, word embedding, paragraph embedding, and potentially other techniques. Advantageously, use of ML in the specific ways described herein can provide insights into this textual information that otherwise would be impossible to determine in an accurate or concise fashion.

For example, clustering can be applied to incident reports to group them into semantically-similar clusters. Once each cluster is identified, common word stems from the incident reports therein can be used to generate a descriptive name for the cluster that is indicative of the content of these incident reports.

Accordingly, a first example embodiment may involve creating a corpus of text from one or more text-based fields in a subset of incident reports, wherein a database stores a plurality of incident reports, wherein the incident reports include text-based fields that document technology-related problems experienced by users of a managed network, and wherein the subset of the incident reports have been determined to be members of a cluster based on a similarity metric applied to at least some of the text-based fields. The first example embodiment may further involve preprocessing the corpus of text by removing stop-words and punctuation. The first example embodiment may further involve mapping words in the corpus of text to word stems, wherein one or more of the words in the corpus of text are mapped to each word stem. The first example embodiment may further involve determining a set of n word stems most frequently-appearing in the corpus of text as mapped. The first example embodiment may further involve determining a set of n words respectively corresponding to the n word stems, wherein each of the set the n words is a shortest word form of the words in the corpus of text that map to the respectively corresponding word stem. The first example embodiment may further involve providing a textual description for the cluster based on the set of n words.

In another example, online chat records can be semantically grouped into clusters and the content of the online chat records in each cluster can be compared to semantic representations of pre-defined virtual agent conversation flows. Clusters with at least a threshold number of online chat records, but without a sufficiently similar conversation flow, may be identified as candidates for development of new conversation flows.

Thus, a second example embodiment may involve determining vector representations for online chat records, wherein the vector representations define the online chat records in a p-dimensional semantic space, wherein a database contains the online chat records and a plurality of pre-defined virtual agent conversation flows, wherein the online chat records include conversational text between at least two parties, and wherein the pre-defined virtual agent conversation flows contain text strings representing canonical questions and statements that are directed toward particular topics. The second example embodiment may further involve creating a plurality of clusters based on the vector representations, wherein each of the online chat records is assigned to one of the clusters, and wherein the clusters define regions of the p-dimensional semantic space. The second example embodiment may further involve using a similarity metric, perform a comparison of texts associated with the clusters to the text strings contained within the pre-defined virtual agent conversation flows. The second example embodiment may further involve identifying a cluster from the plurality of clusters that: (i) has at least a threshold number of the online chat records, and (ii) based on the comparison, has less than a threshold similarity with each of the pre-defined virtual agent conversation flows. The second example embodiment may further involve providing a recommendation to develop a new virtual agent conversation flow for online chat records that are contained within the cluster.

Yet another example may involve generating semantic representations of knowledgebase articles and recent incident reports. Knowledgebase articles that are not sufficient similar to any of the recent incident reports may be marked as candidates for retirement. Conversely, clusters of incident reports may be generated and named as described above, and development of new knowledgebase articles may be suggested for any cluster without sufficient similarity with any of the existing knowledgebase articles.

Therefore, a third example embodiment may involve selecting a subset of incident reports that are associated with dates within a pre-determined window of time, wherein a database contains the incident reports and a knowledgebase, wherein the incident reports include text-based fields that document technology-related problems experienced by users of a managed network, and wherein the knowledgebase contains articles textually describing a subset of the technology-related problems. The third example embodiment may further involve determining vector representations for each of the subset of the incident reports, wherein the vector representations characterize the incident reports in a p-dimensional semantic space. The third example embodiment may further involve calculating similarity metrics between the vector representations and further vector representations that characterize the articles in the p-dimensional semantic space. The third example embodiment may further involve determining, based on the similarity metrics, that a particular article of the articles has less than a first threshold semantic similarity with the subset of the incident reports. The third example embodiment may further involve providing an indication that the particular article is a candidate for removal from the knowledgebase.

In still another example, the semantic representations of incident reports may be generated and compared to analogous semantic representations of skill definitions. Skills with sufficient semantic similarity to incident reports can be associated with these incident reports as recommend skills of individuals who address the incident reports.

Thus, a fourth example embodiment may involve determining mappings (i) from text-based fields for each of a plurality of incident reports to incident vectors in a p-dimensional semantic space, and (ii) from text-based descriptions for each of a plurality of skill definitions to skill vectors in the p-dimensional semantic space, wherein the text-based fields document technology-related problems experienced by users of a managed network, and wherein the text-based descriptions are of skills that can be used to address at least some of the technology-related problems. The fourth example embodiment may further involve performing a comparison, using a similarity metric, of the incident vectors to the skill vectors. The fourth example embodiment may further involve, possibly based on the comparison, identifying, for each of the incident reports, a set of the skill definitions that are most similar thereto. The fourth example embodiment may further involve providing, for each respective incident report of the incident reports, the set of the skill definitions that are most similar thereto as recommended skills that can be used to address the technology-related problems documented in the respective incident report.

In a fifth example embodiment, an article of manufacture may include a non-transitory computer-readable medium, having stored thereon program instructions that, upon execution by a computing system, cause the computing system to perform operations in accordance with the first, second, third, or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third, or fourth example embodiment.

In a seventh example embodiment, a system may include various means for carrying out each of the operations of the first, second, third, or fourth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A depicts a traditional programming procedure, in accordance with example embodiments.

FIG. 6B depicts a machine learning procedure, in accordance with example embodiments.

FIG. 7A depicts an incident report, in accordance with example embodiments.

FIG. 7B depicts an online chat record, in accordance with example embodiments.

FIG. 11E is a flow chart, in accordance with example embodiments.

FIG. 12D is a flow chart, in accordance with example embodiments.

DETAILED DESCRIPTION

Figure 1:
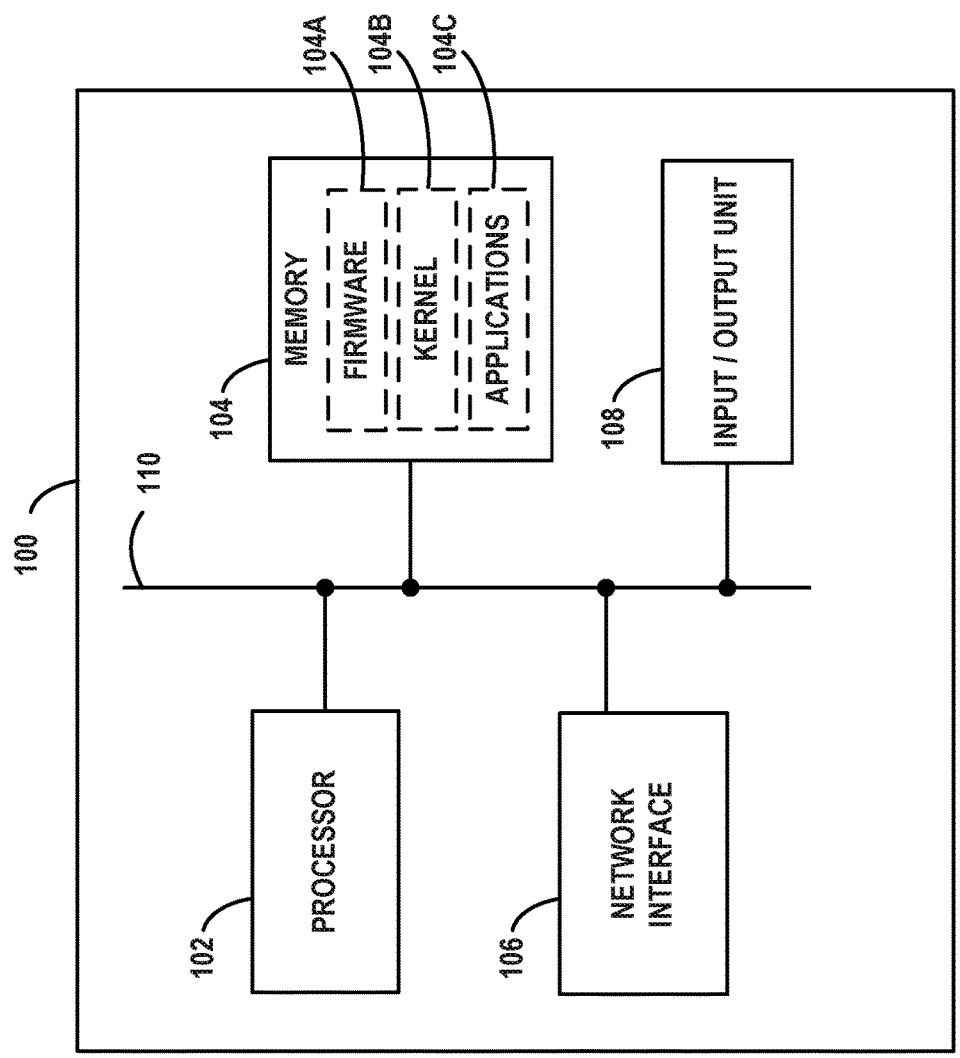
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
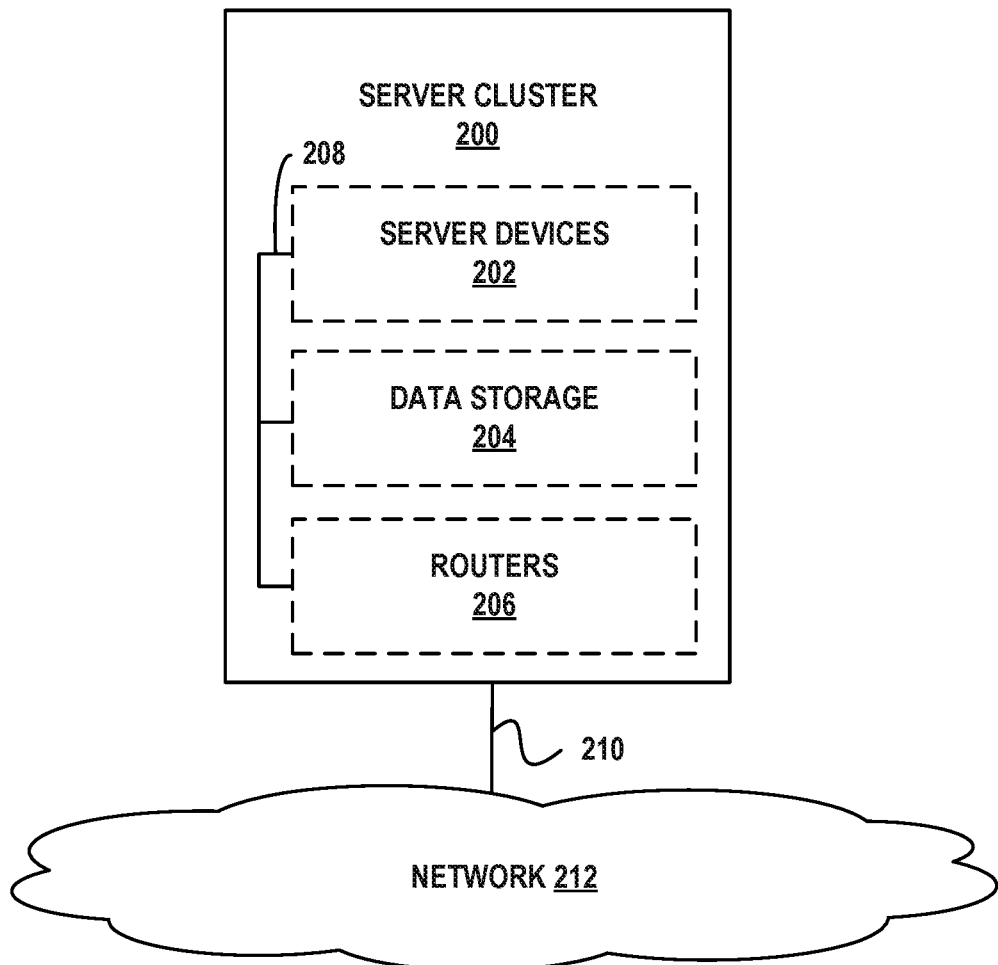
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
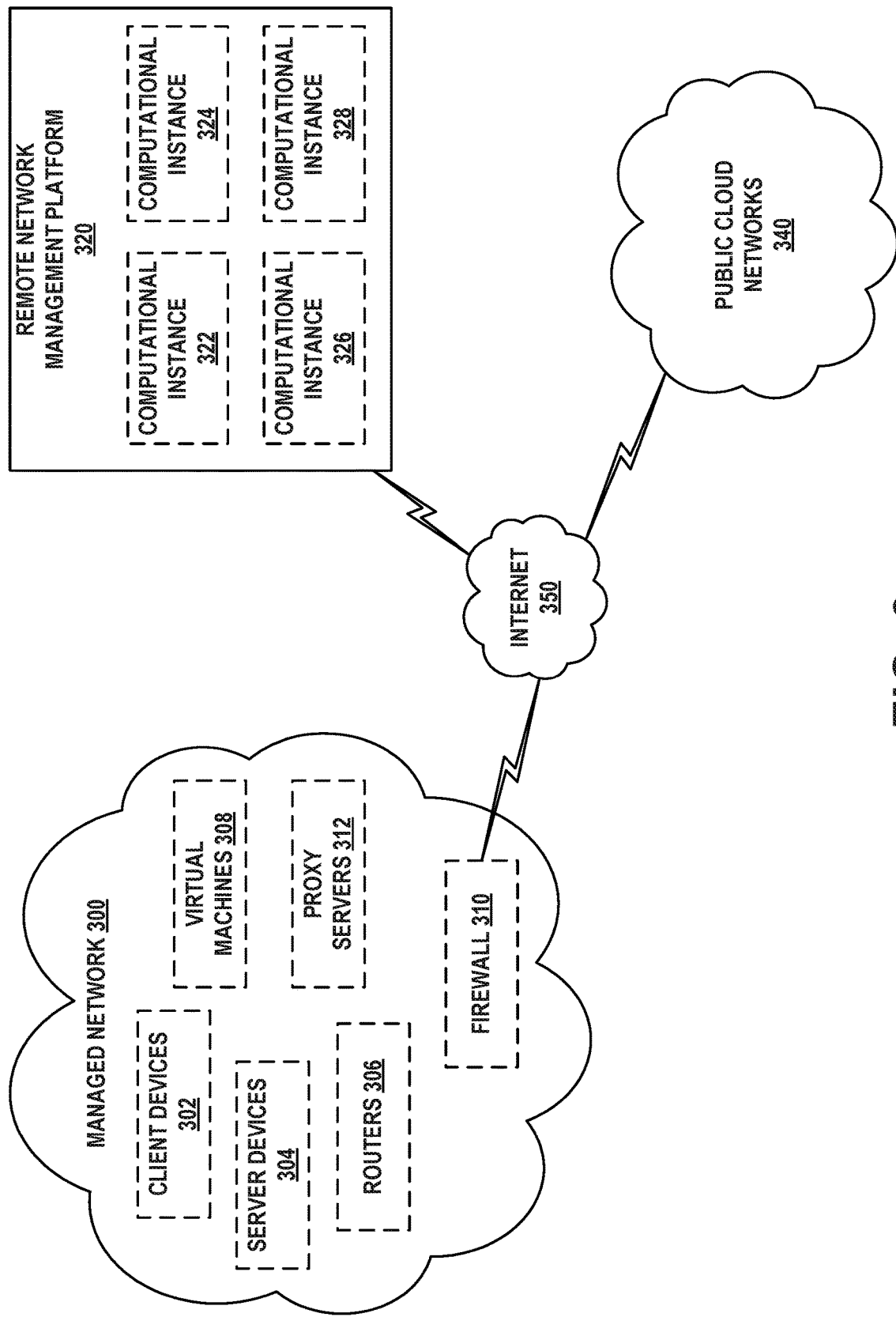
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
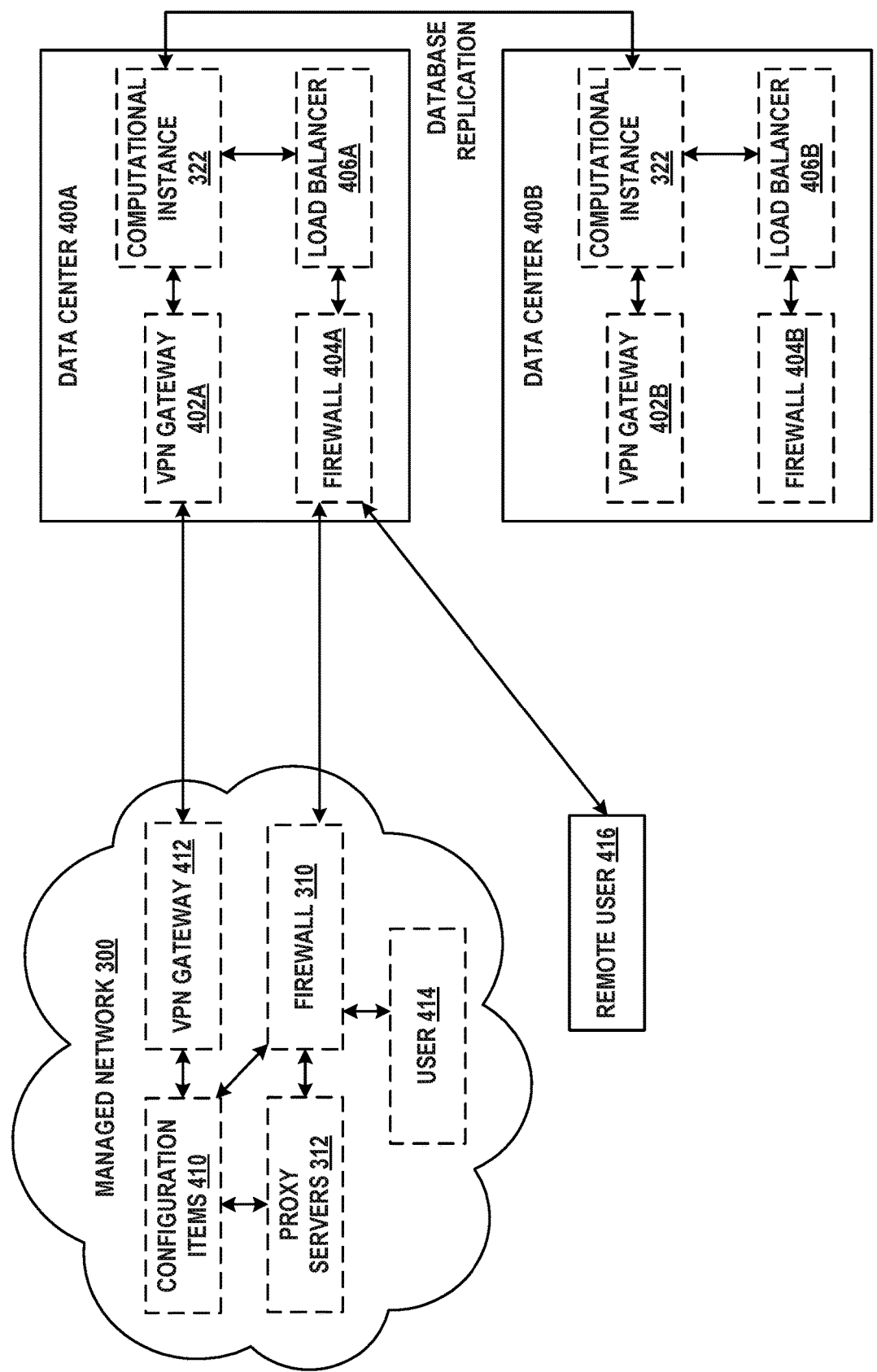
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
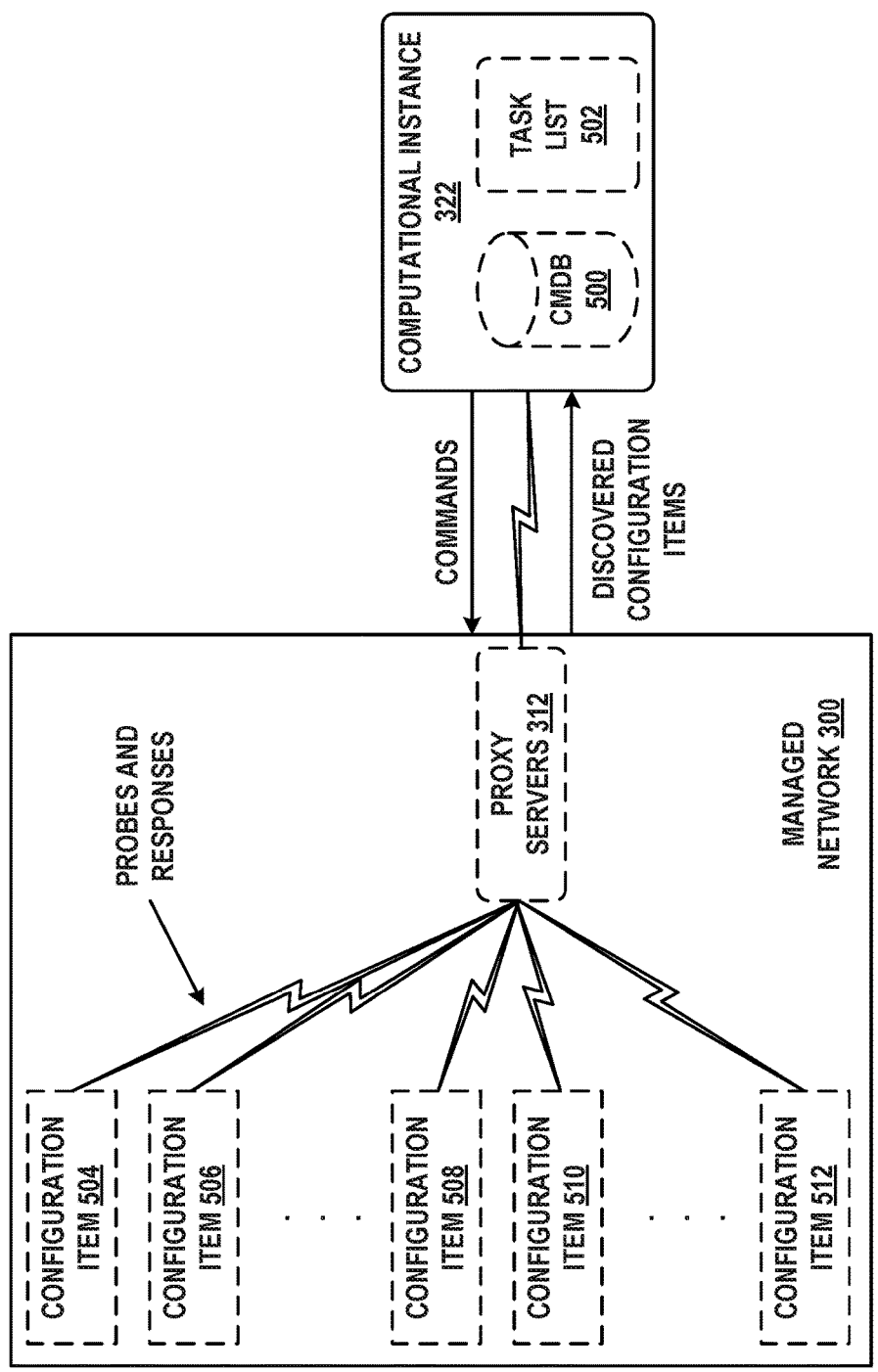
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this determination, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
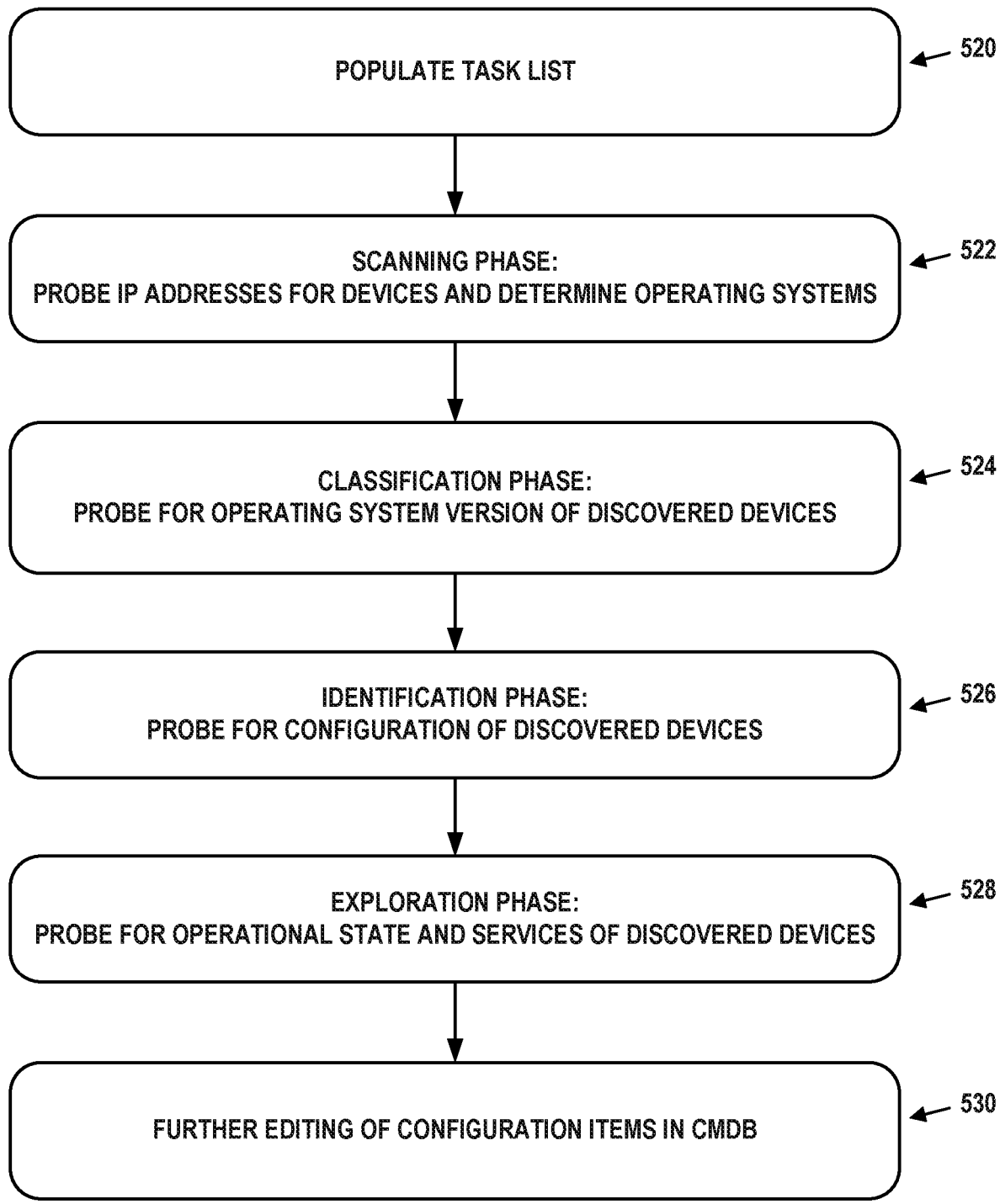
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. MACHINE LEARNING SYSTEMS AND INTEGRATION

Machine learning (ML) encompasses a family of computational techniques that can be integrated into a remote network management platform in a number of ways. For example, a central computational instance may provide ML training (e.g., generation of ML models) and/or production (e.g., execution of ML models against specified input) on behalf of one or more computational instances. Alternatively, the computational instances may operate the ML training and/or ML production themselves. ML techniques can be used in the management and processing of IT records, for example. These IT records may include incident reports, online chat records, and knowledgebase articles among other possibilities.

Regardless, the development cycle for ML systems differs significantly from that of traditional programming. Throughout most of the existence of software engineering, programs were developed according to the process illustrated by FIG. 6A. A program 600 was written and tested so that it could receive production input 602 and produce production output 604. Here, "production input" refers to input found in real-world deployments of program 600, and "production output" refers to the output generated by program 600 in response to receiving production input.

Not shown in FIG. 6A is any testing input and its associated testing output that may be used in a similar fashion during development and testing procedures of program 600. Any such testing input could be synthetically or manually generated, for example, with the goal of ensuring that program 600 behaves as expected when subjected to a range of input.

The development of program 600 involves a human programmer considering possible values of production input 602 and determining what production output 604 should be generated as a result of processing this input. In other words, production input 602 is assumed to be well-defined, and the transformation that maps production input 602 to production output 604 is assumed to be tractable enough to specify algorithmically. More formally, if i represents production input 602 and o represents desired production output 604, the goal of developing program 600 is to develop a function, f, such that $o=f(i)$.

But not all problems can be characterized in a fashion that is conducive to such a mapping. For example, so-called "NP hard" problems do not have polynomial-time solutions, and the best that one can hope for are polynomial-time approximations that produce sufficient solutions most of the time. But these approximation algorithms are often difficult to design and develop. A specific class of problems that has proven challenging for traditional programming techniques is those that attempt to simulate complex human sensory processing, such as speech recognition, natural language processing, image recognition, and so on.

FIG. 6B depicts a different software engineering process. An ML trainer 610 is a program that takes in training input 612 and training output 614. There often is a one-to-one mapping between each unit of training input 612 and a unit of training output 614, though more complex mappings are possible. Further, it is assumed that training input 612 and training output 614, which are usually combined into a single training data set, are quite large with a significant number of such mappings (e.g., hundreds, thousands, or even millions). This training data set may be referred to as having labeled data, in that each input is labeled with its respective ground-truth or desired output value.

The goal of ML trainer 610 is to iteratively (or otherwise) analyze the mappings to build a computational ML model 616 (e.g., an algorithm) that can, with high probability, produce the training output 614 from training input 612. In other words, for each unit of training input 612, the associated unit of training output 614 (or a result sufficiently close thereto) will be produced in the vast majority of instances. Furthermore, ML model 616 may be able to produce desirable output even from input that was not used during its training. In other words, given known input i and known output o, the goal is to algorithmically find function f where $o \approx f(i)$.

This is an example of supervised training. Training may also be unsupervised, in that there is no known output mapping to the inputs, and instead the inputs are classified based on their own inherent characteristics. Examples of unsupervised training techniques include principle component analysis and clustering.

The types of ML models, as well as methods through which these ML models can be trained, vary dramatically. For instance, ML model 616 could include an artificial neural network, decision tree, random forest, support vector machine, Bayes classifier, k-means clusterer, linear regression predictor, and so on. But the embodiments herein may be operable with any type of ML technique.

Once tested, ML model 616 may be placed into production. Thus, like program 600, ML model 616 may receive production input 602. However, ML model 616 may produce production output 618 that is different from production output 604. As alluded to above, a well-trained ML model can often produce production output that is roughly equivalent to or superior to that of a traditionally-developed algorithm.

Nonetheless, training ML model 616 can be highly sensitive to the quality of training input 612 and training output 614. If the training data set does not supply a sufficient amount of data or data with sufficiently representative distributions of data, ML model 616 may fail to produce meaningful output. For example, if a particular parameter of the training data set is constant, then ML model 616 may not be able to produce desirable production output when this parameter takes on other values.

VI. NATURAL LANGUAGE PROCESSING OF TEXTUAL INFORMATION WITH IT APPLICATIONS

Natural language processing is a discipline that involves, among other activities, using computers, often with ML applications, to determine the structure and meaning of human language. This determined structure and meaning may be particularly applicable to and useful for the searching, organizing, and management of IT records, as described below. In this section, three types of IT records are discussed: incident reports, online chat records, and knowledgebase articles. But the embodiments herein may apply to other types of IT records.

A. Incident Reports

Incident reports are often opened by IT users to describe a problem that they have experienced. Each incident report may also be referred to as a record. While incident reports may exist in various formats and contain various types of information, an example incident report 700 is shown in FIG. 7. Incident report 700 consists of a number of fields in the left column, at least some of which are associated with values in the right column.

Field 702 identifies the originator of the incident, in this case Bob Smith. Field 704 identifies the time at which the incident was created, in this case 9:56 AM on Feb. 7, 2018. Field 705 is a text string that provides a short description of the problem. Field 706 is a description of the problem, as provided by the originator. Thus, field 706 may be a free-form text string containing anywhere from a few words to several sentences or more. Field 708 is a categorization of the incident, in this case email. This categorization may be provided by the originator, the IT personnel to whom the incident is assigned, or automatically based on the context of the problem description field.

Field 710 identifies the IT personnel to whom the incident is assigned (if applicable), in this case Alice Jones. Field 712 identifies the status of the incident. The status may be one of "open," "assigned," "working," or "resolved" for instance. Field 714 identifies how the incident was resolved (if applicable). This field may be filled out by the IT personnel to whom the incident is assigned or another individual. Field 716 identifies the time at which the incident was resolved, in this case 10:10 AM on Feb. 7, 2018. Field 718 specifies the closure code of the incident (if applicable) and can take on values such as "closed (permanently)", "closed (work around)", "closed (cannot reproduce)", etc. Field 720 identifies any additional notes added to the record, such as by the IT personnel to whom the incident is assigned. Field 722 identifies a link to an online article that may help users avoid having to address a similar issue in the future. Field 722 might not be filled out in all records.

Incident report 700 is presented for purposes of example. Other types of incident reports may be used, and these reports may contain more, fewer, and/or different fields.

Incident reports, such as incident report 700, may be created in various ways. For instance, by way of a web form, an email sent to a designated address, a voicemail box using speech-to-text conversion, and so on. These incident reports may be stored in an incident report database or table therein that can be queried. As an example, a query in the form of a text string could return one or more incident reports that contain the words in the text string.

B. Online Chat Records

Online chat systems are one-to-one, one-to-many, or many-to-many messaging applications that allow users to communicate with one another using text, audio, images, and/or video. One or more users may join a chat room, and messages that each user types into a text entry box may be transmitted to all users in the room. This allows information to be shared in a semi-real-time manner, more quickly and interactively than via email for example.

Enterprise IT departments may allow technology users to confer with IT personnel by way of online chat systems. Incoming chat requests may be queued for servicing by IT personnel when the latter become available. Once engaged, the chat session may involve back-and-forth messaging between the user and an agent. As these messages may be helpful for auditing purposes, as well as for identifying common types of IT problems, records of online chats may be stored in a database.

In some cases, enterprises may use virtual agents. A virtual agent is a program that simulates a live human agent by using pre-defined or dynamically generated messages arranged in a conversation flow that is intended to answer a user's question or solve a user's problem. In some cases, all incoming chat requests may be initially answered by virtual agents that will either address the user's request or hand off the chat to a human agent.

FIG. 7B depicts example online chat record 730. It consists of several messages between participants Alice and Bob. Bob might or might not be a virtual agent. Each message in online chat record 730 includes indications of the sender 732, the recipient 734, a timestamp 736 of when the message was sent, and the content 738 of the message.

Many online chat records may be stored in a database. This database may be queried to determine how IT personnel have addressed technology problems and requests in the past.

C. Knowledgebase Articles

Unlike incident reports and online chat records, both of which provide some indication of how a specific user's problem or request was resolved, knowledgebase articles are longer, pre-written guides or sets of instructions for addressing certain types of problems. Often, many users have the same technology problems over and over, such as how to reset their enterprise passwords or how to access Wifi networks in various locations. Thus, IT personnel may write knowledgebase articles that address these issues. These articles may take the form of flat files, hyperlinked files, database content, or combinations thereof.

In general, knowledgebase articles are longer, more detailed, and more pedagogical than the information in incident reports or online chat records. Therefore, they provide a way for users or IT personnel to quickly address common problems.

Figure 7C:
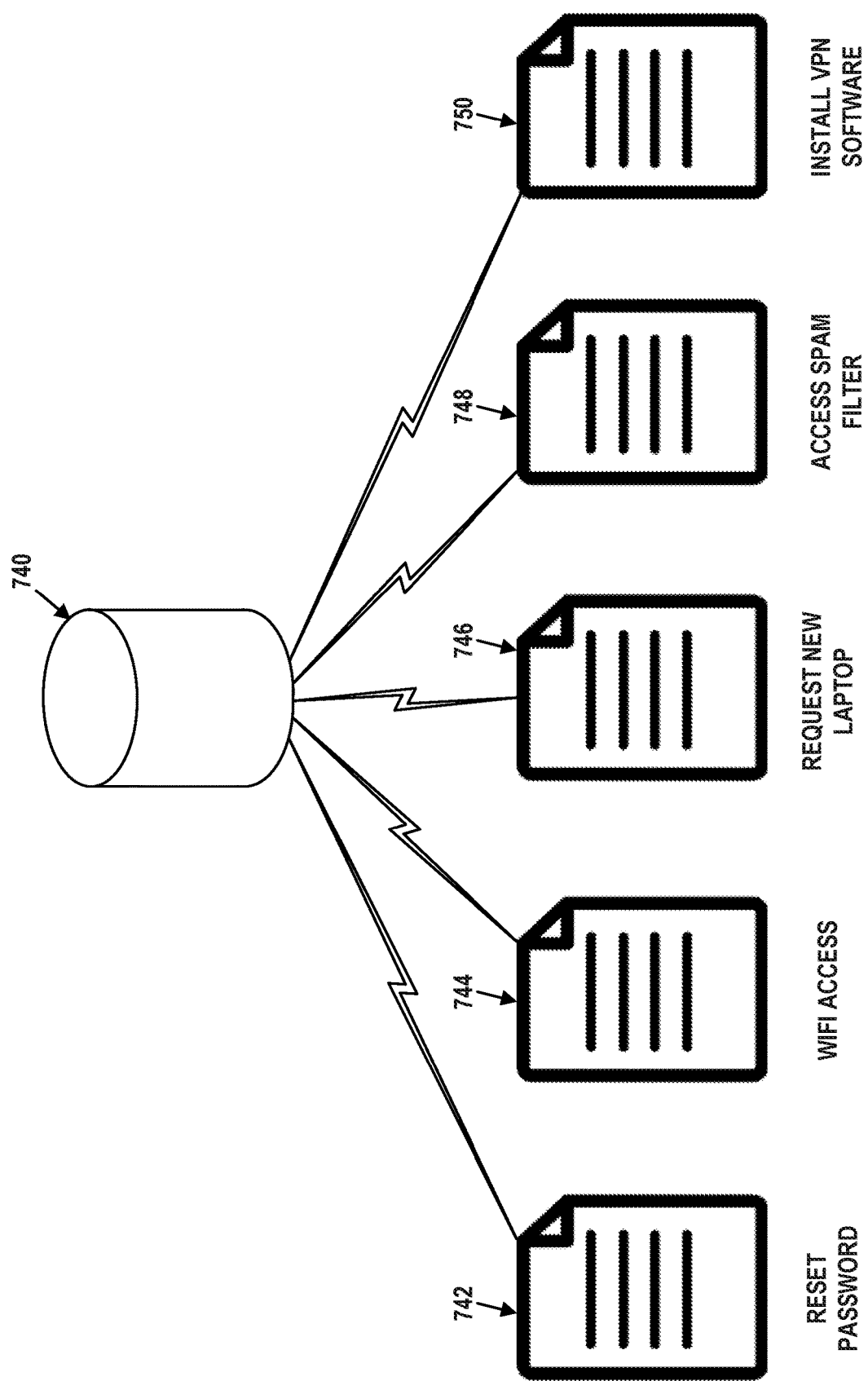
FIG. 7C depicts a knowledgebase, in accordance with example embodiments.

FIG. 7C depicts knowledgebase 740, which may be a database file server, or some other form of storage. Knowledgebase 740 contains five articles 742, 744, 746, 748, and 750, addressing password reset, Wifi access, new laptop requests, spam filter access, and VPN software installation, respectively. Other topics may be present.

D. Access to IT Records

Enterprise users and/or IT personnel may have web-based access to IT records, such as incident reports, inline chat records, and/or knowledgebase articles. These IT records may be stored in one or more databases that can be queried through web-based interfaces for example. Such a query may be used to identify other IT records in which similar issues were addressed. For example, in response to a query, a database of incident reports may provide results including resolved past incident reports or other information that may be relevant to facilitate resolution of a problem represented in the query. In some cases, automated queries may be used to determine common problems or to correlate incident report content with one or more of online chat record content of knowledgebase content.

Figure 8:
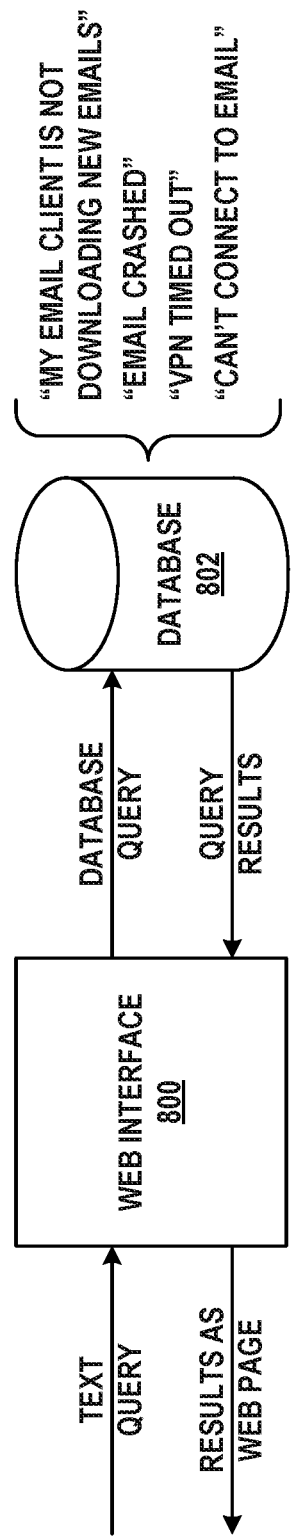
FIG. 8 depicts a database query architecture, in accordance with example embodiments.

A simple query of and response from an incident report table or database is illustrated in FIG. 8. A text query may be entered into web interface 800. This web interface may be supplied by way of a computational instance of remote network management platform 320. Web interface 800 converts the text query into a database query (e.g., an SQL query), and provides the SQL query to database 802. This database may be CMDB 500 or some other database. Database 802 contains a number of incident reports with problem description fields as shown in FIG. 7. Regardless, database 802 conducts the query and returns matching results to web interface 800. One or more such results may be returned. Web interface 800 provides these results as a web page.

Alternatively or additionally, the query may be automatically formed (e.g., without a user explicitly entering the text of the query) and sent in order to identify documents that are similar to subject text. For example, when an incident report is displayed, a query containing the short description thereof may be sent to database 802 to determine similar incident reports and/or knowledgebase articles. In this way, IT personnel can more rapidly determine resolutions to at least some incident reports.

For example, if the text query is "email", web interface 800 may convert this query into an SQL query of database 802. For example, the query may look at the problem description field of a table containing incident reports. Any such incident report that matches the query—i.e., includes the term "email"—may be provided in the query results. Thus, the incident reports with the problem descriptions of "My email client is not downloading new emails", "Email crashed", and "Can't connect to email" may be provided, while the incident report with the problem description "VPN timed out" is not returned.

This matching technique is simplistic and has a number of drawbacks. It only considers the presence of the text of the query in the incidents. Thus, it does not consider contextual information, such as words appearing before and after the query text. Also, synonyms of the query text (e.g., "mail" or "message") and misspellings of the query text (e.g., "emial") would not return any results in this example.

Given the volume of information in databases such as database 802 (millions of IT records for large enterprises), it is desirable to be able to conduct more efficient contextual searches of IT records. Thus, simplistic methods of comparison may be replaced by and/or augmented with a variety of methods that compare the semantic content and/or context of text samples. These methods can improve a variety of ML and non-ML techniques to facilitate natural language processing. Such techniques can include determining word frequencies, word vectors, and/or paragraph vectors from samples of text, and applying artificial neural networks or other deep learning algorithms, clustering, sentiment analysis, or other techniques in order to determine a similarity between samples of text. For example, these or other natural language processing techniques can be applied to determine the similarity between one or more text fields of an incident report and other incident reports, resolved incident reports, online chat records, knowledgebase articles, or other potentially relevant samples of text. Details of example techniques are discussed below.

VII. SIMILARITY METRICS

With respect to natural language processing, ML and non-ML techniques can be used to form word embeddings. Word embedding refers to a set of language modeling and feature learning techniques where terms, words, or phrases from a vocabulary are mapped to vectors of integer or real numbers in an p-dimensional semantic space. This allows algebraic expressions to be applied to words and groups of words to determine the semantic similarities thereof. These similarities may be used with incident reports, online chat requests, knowledgebase articles, other sources, and parts thereof to make recommendations.

In general, the degree of similarity between two samples of text can be determined in a variety of ways. Of the two samples of text, one could be a text field of an incident report and the other could be a text field of another incident report, an online chat, a knowledgebase article, or some other sample of text that may be relevant to the resolution, classification, or other aspects of an incident report. Additionally or alternatively, one or both of the samples could be segments of text within a larger sample of text.

Selecting a relevant set of documents based on a search query could be performed in a variety of ways. In some embodiments, a similarity value could be determined between the search query and the textual summaries of each of the records, and the relevant set selected based on the determined similarity value. This could include selecting the top s most similar records to the search query. In order to improve the search results, the similarity value could be determined based on tokenized versions of the search query and the textual summaries. For example, based on tokenized versions of the search query and/or textual summaries that have had common words (e.g., words from a pre-determined corpus of English words), stop-words (e.g., words manually selected due to describing generic and/or ambiguous technical topics), punctuation, and/or other content removed. The textual summaries in each record could be tokenized before receiving a search query and/or the records could be received already containing tokenized versions of the textual summaries.

A degree of overlap between the identities of words present in the two samples of text and/or a word matrix method could be used to determine the degree of similarity. Additionally or alternatively, one or more techniques of natural language processing could be applied to compare the samples of text such that the context or other semantic content of the texts affects the determined similarity value between the samples of text.

Such techniques may be applied to improve text query matching related to incident reports. These techniques may include a variety of ML algorithms that can be trained based on samples of text. The samples of text used for training can include past examples of incident reports, online chat records, knowledgebase articles, or other text samples of the same nature as the text samples to which the trained model will be applied. This has the benefit of providing a model that has been uniquely adapted to the vocabulary, topics, and idiomatic word use common in its intended application.

Such techniques can include determining the relative frequency of terms (words or tokens) in a corpus and mapping those frequencies into a vector space. Various types of "bag of words" techniques, including term frequency-inverse document frequency (TF-IDF) and related procedures may use such mappings. Additional techniques include determining word and/or paragraph vectors from samples of text, applying artificial neural networks (ANNs) or other deep learning algorithms, performing sentiment analysis, or other techniques in order to determine a similarity between samples of text, to group (cluster) multiple samples of text together according to topic or content, to partition a sample of text into discrete internally-related segments, to determine statistical associations between words, or to perform some other language processing task. In the discussion below, TF-IDF, word vectors, and paragraph vectors are used as example approaches for training a model to represent the sematic meanings of words. These techniques may be combined with one another or with other techniques. For example, word vectors can be clustered according to various clustering algorithms to determine their relative similarities.

A. TF-IDF

TF-IDF is a numerical method that is intended to reflect how important a word is to a document in a corpus. It is often used as a weighting factor in searches of information retrieval, text mining, and user modeling. The TF-IDF value increases proportionally with the number of times a word appears in the document and is offset by the number of documents in the corpus that contain the word, which helps to adjust for the fact that some words appear more frequently in general.

Term frequency metrics could be determined for words of a search query and/or a textual summary of a record in a variety of ways. The term frequency metric could be determined based on a number of times a word occurs in the search query or textual summary normalized to a rate of occurrence of that word in the search query or textual summary or in some other corpus of textual information (e.g., according to a term frequency-inverse document frequency statistic). For example, the term frequency metric for a term in a textual summary of a record could be determined based on a product of a (i) number of times that the term appears in the textual summary, and a (ii) logarithm of a quotient of a count of the records (e.g., in a database containing the records) and a count of the records containing the term. This is illustrated by:

$$c_{t,d} \cdot \log\frac{N}{n_t}$$

where $C_{t,d}$ is the number of times the term t appears in textual summary d, N is the total number of records, and $n_t$ is the number of records in which term t appears.

The term frequency metric for a term in a search query could be determined similarly, based on a product of (i) a number of times that the term appears in the search query, and (ii) a logarithm of a quotient of a count of the records (e.g., in a database containing the records) and a count of the records containing the term. This is illustrated by:

$$c_{t,q} \cdot \log\frac{N}{n_t}$$

Where $c_{t,q}$ is the number of times the term t appears in search query q.

In some examples, the term frequency metric could be a binary or otherwise discrete-valued quantity, e.g., a '1' if the term is present in the search query/textual summary, and a '0' if not. The term frequency metrics for the search query could be such binary-valued quantities while the term frequency metrics for the textual summaries could be determined in some other manner.

Determining the similarity between a search query and a textual summary could include determining, for each word in the search query and the textual summary, respective term frequency metrics. The set of term frequency metrics for the search query and the set of term frequency metrics for the textual summary of the record could then be used to determine the similarity between the search query and the record. This could include determining an inner product between the sets of term frequency metrics, determining a cosine of an angle between the sets of term frequency metrics (cosine similarity), determining an intersection-over-union between the sets of frequency metrics, determining an intersection-over-number of members of words in the search query, or determining some other measure of similarity between the words of the search query and the words of the textual summary of a record.

Factors in addition to the similarity between sets of frequency metrics could be used to select a relevant set of records. For example, some additional metric could be determined for the records and used to set a search scope. The search scope could be used to control whether a record is selected, regardless of the determined similarity value for that record. Setting such a search scope could include controlling an extent to which, for each of the relevant set of the records, each of the terms of the search query is required to be in the textual summaries.

Such an extent of overlap could be measured by counting the number of words that overlap between the search query and the textual summary, and comparing that number to a threshold. In some examples, the amount of overlap could be normalized, e.g., to a number of words present in the search query and/or the textual record. For example, the search scope could be determined for a particular record based on a quotient of (i) an intersection of the query words and the words of the textual summary for the particular record, and (ii) a count of the query words. This is illustrated by:

$$\frac{\|Q \cap S\|}{\|Q\|}$$

Where Q is the set of query words, S is the set of textual summary words, and double vertical brackets ("|| ||") denotes the number of members of a set.

B. Word Vectors

A word vector may be determined for each word present in a corpus of text records such that words having similar meanings (or "semantic content") are associated with word vectors that are near each other within a semantically encoded vector space. Such vectors may have dozens, hundreds, or more elements and thus may define a p-space where p is a number of dimensions. These word vectors allow the underlying meaning of words to be compared or otherwise operated on by a computing device. Accordingly, the use of word vectors may allow for a significant improvement over simpler word list or word matrix methods.

Word vectors can be used to quickly and efficiently compare the overall semantic content of samples of text, allowing a similarity value between the samples of text to be determined. This can include determining a distance, a cosine similarity, or some other measure of similarity between the word vectors of the words in each of the text samples. For example, a mean of the word vectors in each of the text samples could be determined and a cosine similarity between the means then used as a measure of similarity between the text samples. Additionally or alternatively, the word vectors may be provided as input to an ANN, a support vector machine, a decision tree, or some other machine learning algorithm in order to perform sentiment analysis, to classify or cluster samples of text, to determine a level of similarity between samples of text, or to perform some other language processing task.

Word vectors may be determined for a set of words in a variety of ways. In an example, a matrix of the word vectors can be an input layer of an ANN. The ANN (including the matrix of word vectors) can then be trained with a large number of text strings from a database to determine the contextual relationships between words appearing in these text strings.

Algebraic vector operations can be used on word vectors. Thus, subtracting the vector representation of "mail" from the vector representation of "email" is expected to produce a vector with values close to 0. However, subtracting the vector representation of "VPN" from the vector representation of "email" is expected to produce a vector with higher values. In this manner, the model indicates that "email" and "mail" have closer meanings than "email" and "VPN". Thus, after training, words with similar meanings can map to a similar position in the vector space. For example, the vectors for "powerful" and "strong" may appear close to each other, whereas the vectors for "gerbil" and "hypotenuse" may be farther apart. Additions and subtractions between word vectors can also carry meaning. Using vector algebra on the determined word vectors, analogy questions, such as "King"–"man"+"woman"="Queen", can be answered.

Once vector representations have been determined for all words of interest, linear and/or multiplicative aggregations of these vectors may be used to represent text strings. For instance, a vector for a text string can be found by adding together the individual vectors for the words contained therein. In some cases, an average or some other operation may be applied to the vectors for the words. This can be expressed below as the vector sum of m vectors $v_i$ with each entry therein divided by m, where i={1 . . . m}. But other possibilities, such as weighted averages, exist.

$$v_{avg} = \frac{1}{m} \sum_{i=1}^{m} v_i \quad (1)$$

In general, the closer that the vector difference (e.g., a sum of squared distances over each of the p dimensions) between two word vectors is to 0, the greater the similarity of the words they represent. Such a comparison may identify one or more text string vectors from databases 608 or another source that "match" in this fashion. In some cases, this may be the s text string vectors with the highest similarity, or any text string vector with a similarity that is greater than a pre-determined value.

C. Paragraph Vectors

Despite the usefulness of word vectors, the complete semantic meaning of a sentence or other passage (e.g., a phrase, several sentences, a paragraph, a text segment within a larger sample of text, or a document) cannot always be captured from the individual word vectors of a sentence (e.g., by applying vector algebra). Word vectors can represent the semantic content of individual words and may be trained using short context windows. Thus, the semantic content of word order and any information outside the short context window is lost when operating based only on word vectors.

Take for example the sentence "I want a big green cell right now." In this case, simple vector algebra of the individual words may fail to provide the correct semantic meaning of the word "cell," as the word "cell" has multiple possible meanings and thus can be ambiguous. Depending on the context, "cell" could be a biological cell, a prison cell, or a cell of a cellular communications network. Accordingly, the paragraph, sentence, or phrase from which a given word is sampled can provide crucial contextual information.

In another example, given the sentence "Where art thou _____," it is easy to predict the missing word as "Romeo" if sentence was said to derive from a paragraph about Shakespeare. Thus, learning a semantic vector representation of an entire paragraph can help contribute to predicting the context of words sampled from that paragraph.

Similar to the methods above for learning word vectors, an ANN or other machine learning structures may be trained using a large number of paragraphs in a corpus to determine the contextual meaning of entire paragraphs, sentences, phrases, or other multi-word text samples as well as to determine the meaning of the individual words that make up the paragraphs in the corpus. For example, for each paragraph in a corpus, an ANN can be trained with fixed-length contexts generated from moving a sliding window over the paragraph. Thus, a given paragraph vector is shared across all training contexts created from its source paragraph, but not across training contexts created from other paragraphs. Word vectors are shared across training contexts created from all paragraphs, e.g., the p-space vector for each word is the same for all paragraphs. Paragraphs are not limited in size; they can be as large as entire documents or as small as a sentence or phrase.

Once vector representations have been determined for paragraphs in the corpus, linear and/or multiplicative aggregation of these vectors may be used to represent topics of interest. Furthermore, if the dimensions of paragraph vectors are the same as the dimensions of word vectors, then linear and multiplicative aggregation between word vectors and paragraphs vectors can be obtained. For example, finding the Chinese equivalent of "Julius Caesar" using an encyclopedia as a corpus can be achieved by vector operations PV("Julius Caesar")–WV("Roman")+WV("Chinese"), where PV is a paragraph vector (representing an entire article) and WV are word vectors. Thus, paragraph vectors can achieve the same kind of analogies to word vectors with more context-based results.

In practice, such learned paragraph vectors can be used as inputs into other supervised learning models, such as sentiment prediction models. In such models, which can include but are not limited to ANNs, paragraph vectors are used as input with a corresponding sentiment label as output. Other metrics such as cosine similarity and nearest neighbor clustering algorithms can be applied to paragraph vectors to find or group paragraphs on similar topics within the corpus of paragraphs.

D. Clustering

Queries, incident reports, online chat records, knowledgebase articles, and/or other textual or non-textual records can be clustered together. Such clustering may be performed to provide a variety of benefits. For example, clustering may be applied to a set of records in order to identify patterns or groups within the set of records that have relevance to the operation of a system or organization. Such groups may facilitate the tracking of ongoing problems (e.g., network outages, user confusion interfacing with a network-based service) by measuring a time-dependence of records assigned to a particular cluster associated with the ongoing problem(s). Such groups may facilitate the early identification of newly-emerging problems by, e.g., identifying similarities between newly-received reports. In some examples, clustering may allow similar reports (e.g., reports corresponding to the same cluster(s)) to be manipulated in common, in order to reduce the time required to respond to sets of similar reports. For example, reports that are related to a network outage and that are assigned to a single cluster could all be resolved in a single operation following resolution of the network outage.

In some examples, clustering may facilitate the allocation of reports to technicians according to specialty, familiarity, or other factors. Additionally or alternatively, a knowledgebase article, solution flow chart, or other material could be created for each identified cluster in order to facilitate resolution of reports as they are assigned to the clusters. Identifying clusters within a set of queries, incident reports, or other textual or non-textual records can provide additional or alternative benefits.

Incident reports, online chat records, knowledgebase articles, or types of records that may include textual elements and/or non-textual elements can be grouped into clusters in a variety of ways. Such clustering may be performed in a supervised manner in order to generate a clustering algorithm that assigns novel records into clusters according to a manually-classified set of training records. Additionally or alternatively, clustering may be performed in an unsupervised manner in order to generate clusters without the requirement of manually-labeled records, to identify previously un-identified clusters within the training data, or to provide some other benefit.

A variety of methods and/or ML algorithms could be applied to identify clusters within a set of records and/or to assign records (e.g., newly received or generated records) to already-identified clusters. For example, decision trees, ANNs, k-means, support vector machines, independent component analysis, principal component analysis, or some other method could be trained based on a set of available records in order to generate an ML model to classify the available records and/or to classify records not present in the training set of available records.

The inputs to such an ML model could include a variety of features of the records. Such features could be present in the records (e.g., dates and times, status flags, user IDs) and/or determined from information already present in the records (e.g., word vectors, paragraph vectors). For example, the input features could be related to word and/or paragraph vectors generated from textual fields of the records and/or other features generated using natural language processing. The input features could be subjected to a mapping (e.g., a nonlinear transformation, a dimensionality reduction) prior to being applied to the ML model.

For example, each record in a corpus may be represented by a respective location within a two-dimensional space. The location of a given record within the space could be related to the value of two features of the given record (e.g., a time of generation of the record and a user associated with the record, two dimensions of a paragraph vector generated from text of the record). Alternatively, the location of a given record could be related to a projection of more than two features of the record into the two-dimensional space using a linear or nonlinear dimensionality reduction technique or some other mapping method.

Similarity values can be determined for pairs of records in a corpus. Such similarity values could be used to generate an ML model to cluster the records such that the records that are 'similar' in some sense are assigned to the same cluster, while records that are very 'dissimilar' are assigned to different clusters. Such a similarity value could correspond to a distance measure between the records in some space, e.g., the two-dimensional space described above, a semantically-encoded vector space related to word and/or paragraph vectors determined from textual aspects of the records, a vector space that includes dimensions relating to the time of generation of the record or other numerical and/or categorical information of the record, etc. Such a distance could be a Euclidean distance, a Manhattan distance, or some other distance measure according to the properties of a platform application.

As noted above, a variety of methods could be used to generate an ML model that assigns records to two or more clusters and/or that assigns records to a set of residual, un-assigned records. Once the ML model has been determined, the ML model can be applied to assign additional records to the identified clusters represented by the ML model and/or to assign records to a set of residual records. The ML model could include parameter values, neural network hyperparameters, cluster centroid locations in a feature space, cluster boundary locations in a feature space, threshold similarity values, or other information used, by the ML model, to determine which cluster to assign a record and/or to determine that the record should not be assigned to a cluster (e.g., should be stored in a set of residual, un-assigned records). Such information could define a region, within a feature space, that corresponds to each cluster. That is, the information in the ML model could be such that the ML model assigns a record to a particular cluster if the features of the record correspond to a location, within the feature space, that is inside the defined region for the particular cluster. The defined regions could be closed (being fully enclosed by a boundary) or open (having one or more boundaries but extending infinitely outward in one or more directions in the feature space).

In some examples, the ML model could include centroids or other location information indicative of the location, within a feature space, of the clusters. A centroid could be a location of an arithmetic or geometric mean of the locations of records in the cluster, a determined geometric center or other defining location of a hypersphere, hyperellipsoid, or other shape fitted to the records of the cluster, or some other location related to the overall location and/or extent of the cluster in a feature space. In such examples, a record could be assigned to a particular cluster when the location of the record, in the feature space, is closer to the centroid of the particular cluster than it is to the centroid of any other cluster. An ML model organized in such a manner could include a k-means classifier.

In some examples, a record could be precluded from assignment to a particular cluster unless a degree of similarity between the cluster and the record is greater than a threshold similarity. This could include a distance between the location of the record and a centroid or other characteristic location of the cluster being less than a threshold distance. Records that are precluded from inclusion in any cluster could be added to a set of residual records.

In some examples, the ML model could operate in a specified order to determine whether a record should be assigned to each cluster. For example, the ML model could first determine whether a record should be assigned to a first cluster (e.g., by comparing a distance between a centroid of the first cluster and a location of the record to a threshold distance). If it is determined that the record should not be assigned to the first record, the ML model could operate to determine whether the record should be assigned to a second cluster, and so on. Such a method could have the benefit of reducing the expected computational cost of assigning a record to a cluster (or determining that the record should not be assigned to any cluster). Additionally or alternatively, such a method could allow additional clusters to be added to the model without re-assigning any regions of the feature space to the new cluster that had formerly been associated with any of the pre-existing clusters. This could be done by placing the newly added cluster(s) to the end of the sequence for determining whether the record should be assigned to any of the clusters.

VIII. CONTENT-BASED NAMING OF INCIDENT CLUSTERS

A database may contain a large number of incident reports or other records related to IT operations of a managed network. Such incident reports may, for example, be stored in a table of the database. As noted above, incident reports (or other records) can include text-based fields related to technology-related problems experienced by users of the managed network or of some other system. These text-based fields can include short description fields, problem description fields, resolution fields, and/or other fields as described herein.

Managing, reviewing, assessing, or otherwise interacting with such a large set of incident reports, whether manually or via automated processes, can be difficult. To simplify interaction with large sets of incident reports, it can be beneficial to organize the incident reports into clusters, such that incident reports that are similar in some respect (e.g., incident reports related to the same or similar technology-related problems and/or the same or similar types of computing devices or software) are assigned to the same cluster. The records may be clustered via a variety of techniques described herein.

These methods could be based in whole or in part on the content of the text fields of the incident reports, e.g., based on the short description, problem description, resolution, or other specified text field(s) of the incident reports. For example, the contents of one or more of the text fields could be used to determine, for each incident report, a respective vector representation in a p-dimensional semantic space (e.g., a word vector space, a paragraph vector space, or a term frequency-inverse document frequency (TF-IDF) space as described above). Similarity metrics between the vector representations in the p-dimensional semantic space (e.g., distances between the representations in the p-dimensional semantic space) could be used to generate the clusters and to determine which incident reports should be assigned to which clusters.

For example, determining that a particular incident should be assigned to a particular cluster could include determining that the vector representation of the particular incident is within a region (e.g., a bounded region, an unbounded region) of the p-dimensional semantic space that corresponds to the particular cluster. This could include determining that a distance between the vector representation of the incident report and a centroid or other vector representation of the cluster is less than a threshold distance, determining that the vector representation of the incident report is closer to a centroid of the cluster than to the centroid of any other cluster, or making some other determination.

Once the incidents are assigned to clusters, the clusters can be used to simplify management of the incident reports, searching the incident reports, and/or assigning new incident reports to human or virtual agents. Further, the assignment of incident reports into one or more of the clusters may provide insight into the ongoing functioning of a managed network or common problems experienced by its users, and/or may facilitate some other activity. For example, all of the incident reports in a particular cluster could be resolved, deleted, deprecated, or otherwise manipulated in common (e.g., due to a change in the managed network that impacts the content of the incident reports in the particular cluster). This may reduce technician time spent managing the database of incident reports. In another example, an IT professional searching for potential solutions to a problem could restrict their search to incident reports within one or more relevant clusters. In yet another example, the number of incident reports, change in number of incident reports, or other properties of the clusters could be analyzed to determine where to allocate IT professional effort, e.g., to design an additional virtual agent dialog tree, to upgrade hardware/software, or to make some other change to the managed network.

However, it can be difficult for an IT professional or other user to determine what a cluster is "about," e.g., what similarities exist between the incident reports within the cluster that resulted in their being assigned to the same cluster. Without this contextual information, it may be more difficult for the IT professional to determine which clusters are relevant to a particular user's ongoing problem, what actions to take in response to a particular cluster receiving a disproportionate amount of newly generated incident reports, or how to use the clusters to positive effect according to some other application. The information used to define the clusters can be difficult or impossible for a human to parse in order to determine the semantic content of incident reports grouped within the cluster. For example, if the cluster is defined by neural network parameters, centroids or information defining a region in a p-dimensional semantic space, or other information that is not "human-understandable," this defining information may not be helpful in providing an IT professional with the context of the cluster's content. While the IT professional could review some or all of the incident reports in the cluster to gain an understanding of the cluster, such a process can be very time-intensive, as the cluster may include many incident reports (e.g., hundreds or thousands).

To address these issues, embodiments described herein provide mechanisms for determining, based on the incident reports assigned to a cluster, a string of words that describes the cluster and that can provide an IT professional with an understanding of the semantic content of incident reports within of the cluster. This descriptive information is determined based on the text contained within one or more of the text fields of the incident reports. It can be difficult to extract such meaning from the text of incident reports, as the reports may contain a variety of extraneous textual data (common parts of speech, names, punctuation, whitespace). Additionally, misspellings, different tenses or forms of the same word (e.g., email, emails, emailing, emailed) that represent the same contextual information, or other factors related to the textual information can make it difficult to estimate the informational content of the incident reports without under-representing or over-representing certain words.

The embodiments described herein compensate for these and other factors to generate descriptive strings for clusters of incident reports. While focused on incident reports, these embodiments could be used to generate such strings from the text of other types of records.

A. Extracting Semantic Content from Incident Reports

Figure 9A:
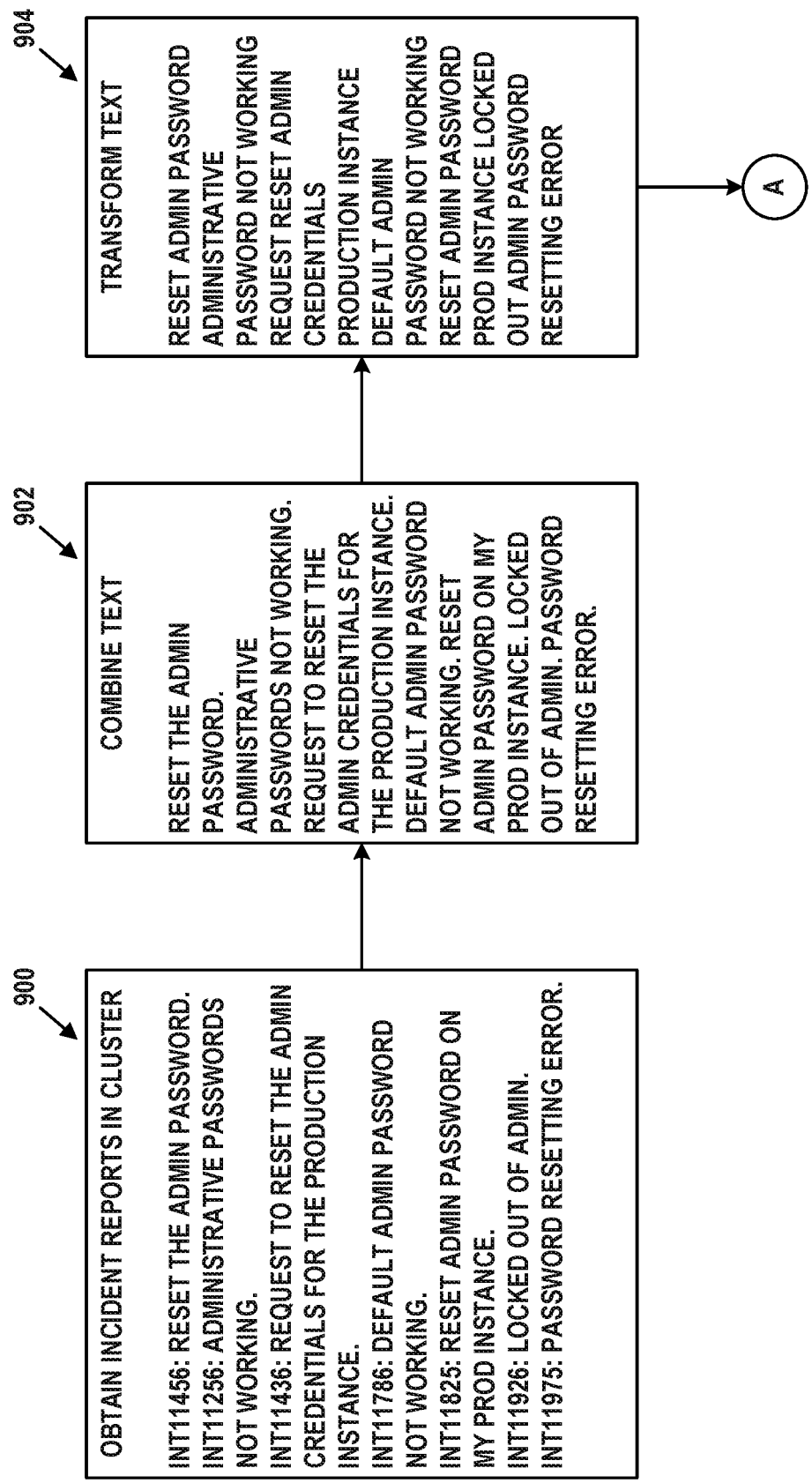
FIG. 9A depicts steps for naming a cluster of incident reports, in accordance with example embodiments.
Figure 9B:
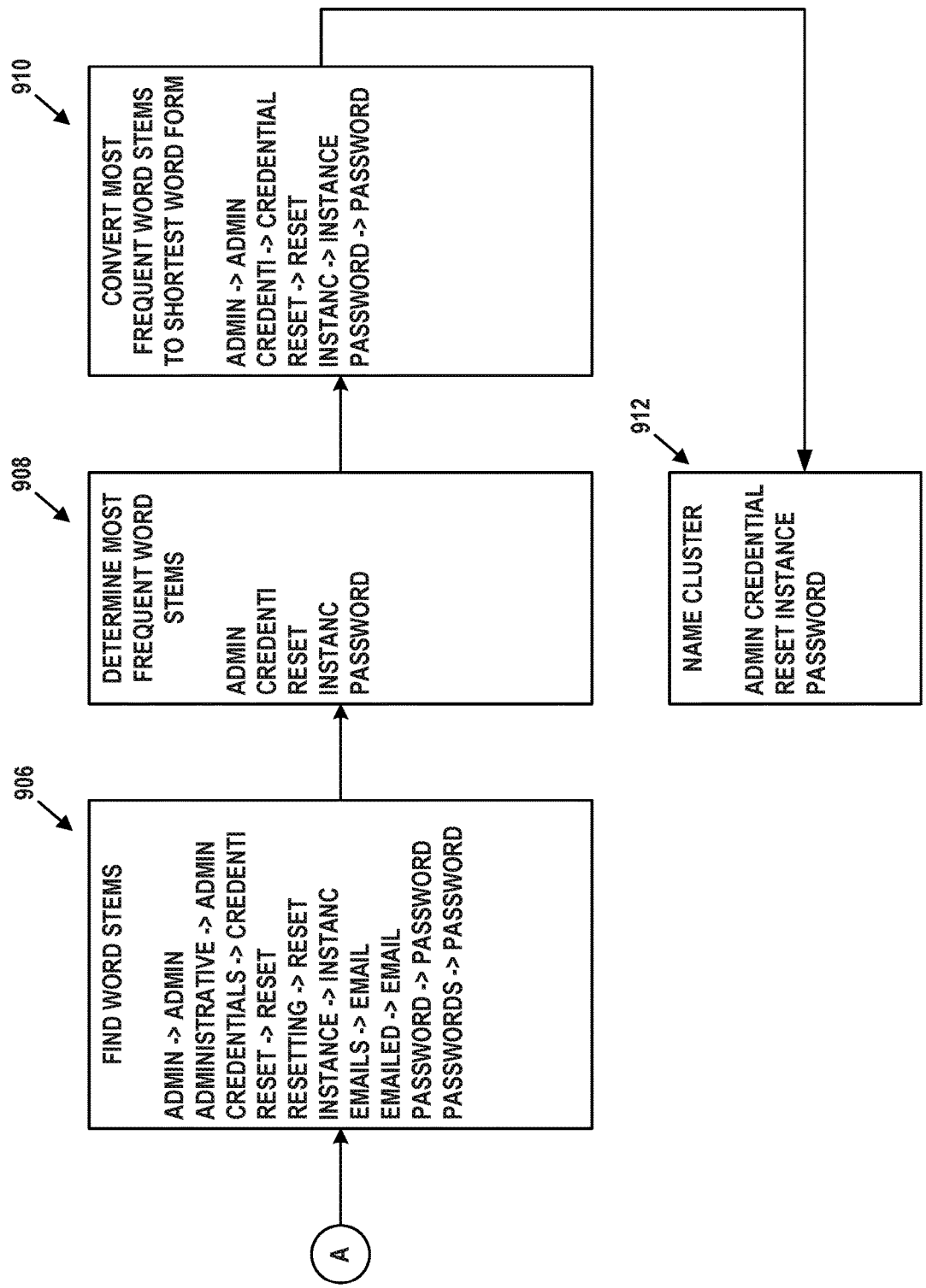
FIG. 9B depicts further steps for naming a cluster of incident reports, in accordance with example embodiments.

FIGS. 9A and 9B depict a procedure for extracting semantic content from incident report text. Block 900 of FIG. 9A may involve obtaining incident reports from a cluster. As shown, each incident report may have a certain amount of textual information describing a problem and/or requesting an action. The incident reports of block 900 include an identifier of each incident report (e.g., INT11456, INT11256) and text from a corresponding short description, for example.

Block 902 involves extracting and combining the textual information from the incident reports to generate a corpus of text. This can include extracting all of the text from all of the incident reports. Alternatively, only the text from a subset of the text fields of the incident reports may be extracted to generate the corpus of text. As shown, only the text from the short description is used to generate the corpus of text. Generating the corpus of text could include concatenating together all of the text fields extracted from the incident reports in the cluster, or could include combining the contents of the text fields in some other manner.

Block 904 may involve transforming the corpus of text. This can include removing stop words, punctuation, and other irrelevant or otherwise unwanted contents of the corpus of text. Doing so could further include removing redundant whitespace, removing proper names, removing numbers, or removing some other contents. Letters in the corpus of text could also be converted into lowercase to avoid confounding subsequent analyses by the presence of words that would be the same but for differences in capitalization. A process could be applied to the corpus of text to convert acronyms and/or initialisms into a specified format, e.g., converting L.L.C. to llc, d/b/a to dba, SCUBA to scuba, etc. In some examples, misspellings or other errors in the corpus of text could be detected and corrected.

As indicated by off-page reference A, the procedure continues to block 906 of FIG. 9B. In block 906, the remaining contents of the corpus of text could be modified to map the words of the corpus to their word stems. For example, the words "email," "emails," "emailed," and "emailing" could all be mapped to the word stem "email." This mapping of words to word stems can be performed in order to equalize the representation of the informational content underlying the words present in the corpus of text such that concepts are not over- or under-represented in subsequent analysis due to the number of ways (e.g., word forms) by which the concepts are represented. Mapping words to word stems could be limited to mapping different tenses/forms of a single word. Alternatively, mapping word to word stems could be expanded by mapping synonyms or other words with similar meaning to a single stem word. For example, the words "microcontroller," "microcontrollers," "microcontroller(s)," "processor," "processors," "processor (s)," "microprocessor," "microprocessors," and "microprocessor(s)" could all be mapped to the word stem "processor."

Mapping words in the corpus of text into word stems could include a variety of processes. For example, known suffixes, like 's,' 'es,' 'ed,' 'ing,' 'and 'ly' could be removed from the words in the corpus of text. Additionally or alternatively, a dictionary of mappings between words and word stems could be applied to map the words in the corpus of text to respective word stems. Such a dictionary-based approach could facilitate more complex mappings, such as mapping misspelled words to the word stem of the correctly-spelled word or mapping synonyms to a common word stem.

Block 908 may involve determining the most frequent word stems. For example a subset of n word stems (e.g., the n most frequently-appearing word stems) from the corpus of text could be determined. The number, n, of determined word stems could be a small number, e.g., between one and five inclusive. Further, this number could be predetermined, or could be determined based on the word stems in the corpus of text. For example, n could be determined such that the word stems represent at least a specified fraction of the words in the corpus of words, represent words present in at least a specified fraction of the incident reports in the cluster, or such that some other consideration is satisfied.

The n determined word stems could be determined in a variety of ways. For example, the n determined word stems could be the n most common word stems in the mapped corpus of text. In another example, a TF-IDF value or some other normalized term frequency value could be determined for each of the word stems and the determined TF-IDF values could be used to determine the n word stems having the highest TF-IDF values. In some examples, a combination of different factors could be used to determine the n word stems. For example, a weighted combination of the absolute frequency and the TF-IDF of the word stems could be used.

B. Cluster Naming

Block 910 may involve converting the n word stems into n words that will form part of a textual description (name) for the cluster. Converting the word stems into respective words could include mapping each word stem to a respective default word (e.g., using a dictionary). Such a default word could be the shortest word, with respect to number of letters, number of syllables, etc., that is present in the dictionary as being mapped to the particular word stem. Alternatively, the word stem could be mapped to the shortest word (with respect to number of letters, number of syllables, etc.) that was present in the corpus of text and that was mapped to the word stem. For example, if the words "email," "emails," "emailed," and "emailing" map to the word stem "email", then the word "email" may be chosen as the shortest word that maps to this word stem.

Block 912 may involve the n words being applied to provide a textual description for the cluster. This can include providing the n words on a display, e.g., in combination with a representation of the cluster, a link to the cluster and/or contents thereof, a button or other user interface element for accessing, modifying, or otherwise interacting with the cluster, or some other user interface elements.

A user could be presented with a user interface to permit the user to review, edit, and/or approve the set of n words. Upon approval, an indication of the n words (or edited versions thereof) could be stored in a database with the cluster that they describe as the name of that cluster.

The determined n words could be used to facilitate a variety of applications. In some examples, the n-word textual descriptions could be used to facilitate searching for incident reports in the database of incident reports. For example, a search query could be received and compared to the name of each of the clusters in the database. Based on this comparison, a reference to one or more clusters (e.g., one or more clusters whose names are most similar to the search query) and/or to one or more incident reports therein could be provided to the user or system that transmitted the search query.

Over time, the subset of incident reports in a database that are assigned to a particular cluster may change. This may be due to incident reports being added or subtracted from the database, new clusters being determined and incident reports being re-assigned thereto, or other mechanisms. Accordingly, over time, the textual description determined for a particular cluster may become out of date. Thus, the embodiments described herein may be performed again, to re-determine a textual description for a cluster. Such a re-determination could be performed according to a schedule (e.g., once a week) or in response to a detected change in the composition of the cluster. For example, such a re-determination could be performed in response to determining that a threshold number or fraction of incident reports has been added to/subtracted from the cluster. Thus, the name of a cluster may change over time and the user may be prompted to update such names accordingly.

C. Example Operations

Figure 9C:
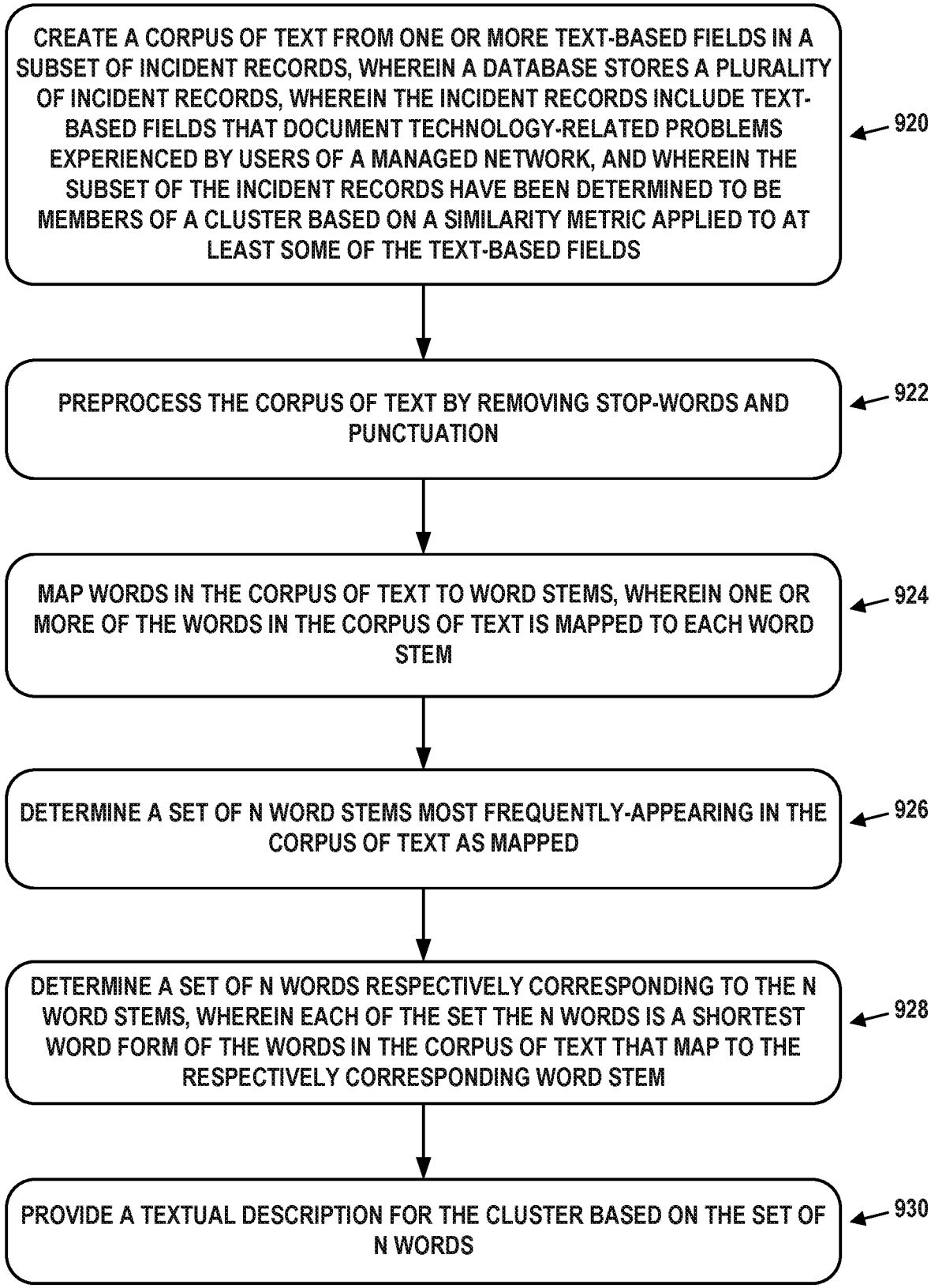
FIG. 9C is a flow chart, in accordance with example embodiments.

FIG. 9C is a flow chart illustrating an example embodiment. The process illustrated by FIG. 9C may be carried out by a computing device, such as computing device 100, and/or a cluster of computing devices, such as server cluster 200, perhaps in the context of a computational instance. However, the process can be carried out by other types of devices or device subsystems. For example, the process could be carried out by a portable computer, such as a laptop or a tablet device.

The embodiments of FIG. 9C may be simplified by the removal of any one or more of the features shown therein. Further, these embodiments may be combined with features, aspects, and/or implementations of any of the previous figures or otherwise described herein.

Block 920 may involve creating a corpus of text from one or more text-based fields in a subset of incident reports, wherein a database stores a plurality of incident reports, wherein the incident reports include text-based fields that document technology-related problems experienced by users of a managed network, and wherein the subset of the incident reports have been determined to be members of a cluster based on a similarity metric applied to at least some of the text-based fields.

Block 922 may involve preprocessing the corpus of text by removing stop-words and punctuation.

Block 924 may involve mapping words in the corpus of text to word stems, wherein one or more of the words in the corpus of text is mapped to each word stem.

Block 926 may involve determining a set of n word stems most frequently-appearing in the corpus of text as mapped.

Block 928 may involve determining a set of n words respectively corresponding to the n word stems, wherein each of the set the n words is a shortest word form of the words in the corpus of text that map to the respectively corresponding word stem.

Block 930 may involve providing a textual description for the cluster based on the set of n words.

In some embodiments, determining that the subset of the incident reports are members of the cluster involves: (i) determining vector representations for each of the subset of the incident reports, wherein the vector representations define the incident reports in an p-dimensional semantic space; (ii) calculating the similarity metric over the vector representations; and (iii) determining that the similarity metric indicates that all of the vector representations are located within a bounded region of the p-dimensional semantic space.

In some embodiments, the similarity metric represents a distance in the p-dimensional semantic space between two of the vector representations.

In some embodiments, the text-based fields include a short description, a problem description, and a resolution, and wherein the vector representations are determined from one or more of the short description, the problem description, or the resolution.

In some embodiments, preprocessing the corpus of text also includes converting the corpus of text to lowercase and removing redundant whitespace.

In some embodiments, a dictionary associates vocabulary words to respective vocabulary word stems, and wherein mapping the words in the corpus of text to word stems comprises looking up, in the dictionary, the words in the corpus of text to determine the word stems.

In some embodiments, mapping the words in the corpus of text to word stems comprises removing suffixes from the words in the corpus of text, wherein the suffixes removed include 's', 'es', 'ed', 'ing', and 'ly'.

In some embodiments, n is between 1 and 5 inclusive.

In some embodiments, the shortest word form has a least number of letters of all word forms of the words in the corpus of text that map to the respectively corresponding word stem.

In some embodiments, providing the textual description for the cluster based on the set of n words comprises providing the set of n words to a user for display, editing, or approval.

In some embodiments, the one or more processors are further configured to: (i) receive, from a user, approval of the textual description or and edited variation thereof; and (ii) store, in the database and with the cluster, an indication of the textual description as approved.

Some embodiments may further involve: (i) receiving a search query; (ii) performing a comparison of the search query to the textual description as approved; and (iii) based on the comparison, providing, as a result of the search query, references to one or more of subset of the incident reports.

In some embodiments, creating the corpus of text from one or more of the text-based fields in the subset of the incident reports in the cluster involves creating the corpus of text by concatenating all instances of the one or more of the text-based fields in the subset of the incident reports in the cluster.

Some embodiments may further involve: (i) determining that the subset of the incident reports in the cluster has changed; (ii) creating a second corpus of text from the one or more of the text-based fields in the subset of the incident reports in the cluster; (iii) preprocessing the second corpus of text by removing stop-words and punctuation; (iv) mapping words in the second corpus of text to the word stems, wherein one or more of the words in the second corpus of text is mapped to each word stem; (v) determining a second set of n most frequently-appearing word stems in the second corpus of text as mapped; (vi) determining a second set of n words respectively corresponding to the second set of n most frequently-appearing word stems, wherein the each of the second set of n words is a shortest word form of the words in the second corpus of text that map to the respectively corresponding word stem, and wherein the second set of n words is different from the set of n words; and (vii) providing a second textual description for the cluster based on the second set of n words.

IX. MAPPING CLUSTERED ONLINE CHAT RECORDS TO PRE-DEFINED WORKFLOWS

In order to reduce support wait times, to improve the quality of provided network management by allowing human technicians to be reserved for more difficult cases, or to provide some other benefits, a support system of remote network management platform may employ "virtual agents" in order to address common and/or simple user problems via online chat. The use of such a virtual agent allows for users with relatively straightforward problems to resolve their problems without engaging with a human technician, allowing available human technicians to be allocated to more difficult tasks (where the skills and adaptability of a human agent are more valuable). Additionally, virtual agents often reduce the amount of time that the majority of users wait before having their problems addressed. In the event that a virtual agent is unable to address a user's problem, the user can be directed to a human technician (e.g., via the same online chat interface used by the virtual agent to interact with the user).

Such a virtual agent may be implemented in a variety of ways. In some examples, the virtual agent may include a plurality of pre-defined virtual agent conversation flows that may be stored in a database (e.g., a database of the remote network management platform). A pre-defined virtual agent conversation flow can include a full or partial ordering of text strings representing canonical questions and statements, or other textual or non-textual information, directed toward particular topics. For example, a particular pre-defined virtual agent conversation flow could be directed toward the topic of resetting an email password.

A pre-defined virtual agent conversation flow could include linear and/or tree-based representations of conversation flow, as well as accessory information sufficient to allow a virtual agent system to determine whether to progress the conversion and, if so, to which portion of the pre-defined virtual agent conversation flow. Natural language processing, word matching, or other techniques may be used to determine how to progress through the pre-defined virtual agent conversation flow. In some examples, the pre-defined virtual agent conversation flow could include one or more contingencies wherein a user is redirected to another pre-defined virtual agent conversation flow, or to a human technician. Such a pre-defined virtual agent conversation flow could include an indication of the identity of such a human technician, or of a set of skills or qualifications that could be used to select the human technician from a set of available human technicians.

A particular pre-defined virtual agent conversation flow could be selected from a set of such conversation flows based on user inputs. For example, natural language processing, word matching, or other techniques could be applied to determine, based on textual user input that is associated with a chat request, that the user's chat request involves a particular topic. Additional information associated with the user could be used to make this determination. For example, information associated about a user's identity, account, or activity on the managed network, information input by the user to access the chat (e.g., survey data, radio button selections, etc.), or other information could be used in addition to, or instead of, textual user input that is associated with a chat request in order to determine that the user's chat request involves the particular topic. In response to determining that the user's chat request involves the particular topic, a particular one of the pre-defined virtual agent conversation flows that is directed toward the particular topic could be executed.

Pre-defined virtual agent conversation flows are generally generated by the effort of a human programmer or other human technician. The human technician may generate a pre-defined virtual agent conversation flow based on their knowledge of a problem, possible solutions, or other information. For example, the human technician may consult a set of chat records, incident reports, or other records related to users experiencing a problem related to the topic to which the new pre-defined virtual agent conversation flow is to be directed. The human technician may then generate canonical questions, statements, or other textual information directed toward the particular topic. The human technician may also generate a structure (e.g., a linear structure, a tree structure) for the conversation flow, conditions (e.g., text strings for comparison) to determine when and how to navigate the conversation flow, information used to determine whether to execute the newly-programmed conversation flow in response to textual user input or other information related to a chat request, or other information used to define the new pre-defined virtual agent conversation flow.

The process of generating a new pre-defined virtual agent conversation flow can be expensive with respect to the human technician time it takes to generate the conversation flow. Additionally, it can be difficult to determine what discrete, identifiable problems/topics are in need of such a new pre-defined virtual agent conversation flow. In order to efficiently allocate limited technician time, and also to ensure that common problems are addressed by at least one pre-defined virtual agent conversation flow, it can be beneficial to identify when a threshold number of users are experiencing a single, identifiable problem that can be beneficially addressed by a new pre-defined virtual agent conversation flow. However, such an identification process may, itself, require extensive human technician time to review incoming incident reports, chat logs, or other information related to ongoing problems experienced by users and to identify, within that corpus of information, discrete problems that are amenable to resolution by a new pre-defined virtual agent conversation flow.

This process of identification can be improved by applying the clustering methods described herein to identify clusters of related online chat records within a database of online chat records. Such online chat records include conversational text between at least two parties, e.g., between a user and a technician tasked with resolving the user's problem. Such a database of stored online chat records can be a valuable source of information about the types of problems that are being experienced by users of a managed network. For example, each cluster of chat records identified within such a database of chat records could be investigated as a potential problem in need of a corresponding new pre-defined virtual agent conversation flow. To reduce duplicated effort, each identified cluster could be compared to a set of existing pre-defined virtual agent conversation flows to determine whether any of the identified clusters are serviced by a corresponding one (or more) of the existing pre-defined virtual agent conversation flows.

Any clusters found not to be serviced by any existing pre-defined virtual agent conversation flows could be recommended for development of new pre-defined virtual agent conversation flows. Such a recommendation, of an identified un-serviced cluster of online chat records, could be provided to a technician, a manager, or some other person via a display or some other means. Providing such a recommendation could include providing information sufficient for a technician to identify the cluster, review its contents, assess whether a new pre-defined virtual agent conversation flow is warranted for the recommended cluster, and generate the new pre-defined virtual agent conversation flow along with any execution rules or other programming information related to the new pre-defined virtual agent conversation flow. For example, providing such a recommendation could include providing an indication of the identity of the cluster and an indication of text associated with the cluster (e.g., text from online chat records assigned to the cluster). To prevent misallocating technician effort toward problems that are too rarely experienced by users, such recommendations could be generated only for clusters containing more than a threshold number of online chat records, e.g., more than 5, 10, 25, or some other threshold number of online chat records.

A new pre-defined virtual agent conversation flow, generated in response to such recommendation, could be received for the identified unserved cluster. The received new pre-defined virtual agent conversation flow could then be stored, along with rules for triggering execution of the new pre-defined virtual agent conversation flows, in a database.

A. Clustering Online Chat Records

Clusters of online chat records could be identified within a plurality of online chat records. In some examples, a vector representation, in a p-dimensional semantic space, could be determined for each of the online chat records. Such a p-dimensional semantic space could be a vector space related to TF-IDF coefficients for words in the online chat records, a vector space into which word and/or paragraph vectors are projected, or some other p-dimensional space wherein different locations or regions within the p-dimensional space correspond to respective words, concepts, or other semantic content. The vector representation for a particular online chat record could be determined in a variety of ways. For example, the vector representation could be determined based on conversational text from the online chat record.

The first few user inputs in a given online chat are likely to contain more information related to the problem a user is experiencing than later inputs, which are more likely to contain less-useful text related to the performance of technician-suggested diagnostic processes, like "that didn't work," "I'll try that," etc. Accordingly, determining a vector representation for a particular online chat record could include determining vector representations for an initial set (e.g., an initial 1-10) of user inputs from the particular online chat record.

The determined vector representations for the online chat records could then be used to create clusters of the online chat records such that each of the online chat records is assigned to one of the clusters. Accordingly, the clusters define regions of the p-dimensional vector space to which the vector representations of their constituent online chat records are projected. Such regions could be closed regions or open regions. Such clustering may be performed according to a variety of methods described herein such that online chat records having vector representations that are nearby in the p-dimensional vector space are assigned to the same cluster. This could include determining distances within the p-dimensional semantic space or other similarity values between the vector representations of the online chat records. The clusters may defined by centroids, hyperspheres, radii, or other features in the p-dimensional semantic space. To facilitate use of the clusters (e.g., to generate new virtual agent conversation flows), textual descriptions can be determined for the clusters based on the frequencies of words therein, e.g., using the process illustrated by FIGS. 9A-9C.

Figure 10A:
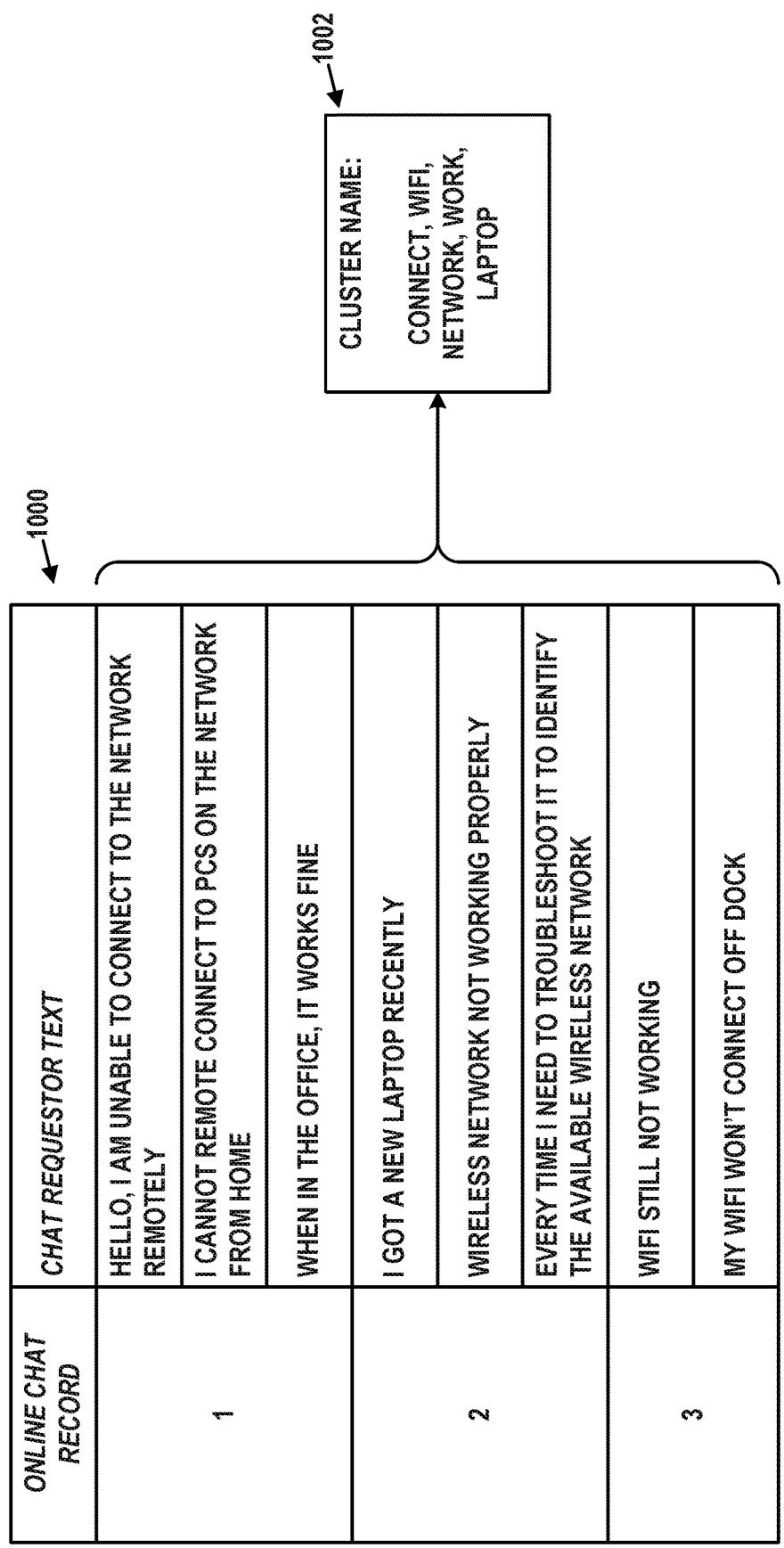
FIG. 10A depicts naming a cluster of online chat records, in accordance with example embodiments.

As an example, FIG. 10A depicts online chat records 1000, each including a record indicator (e.g., 1, 2, 3) and text received from the chat requestor (e.g., the end user seeking assistance). For example, online chat record 1 includes three entries relating to a user being unable to connect to an enterprise's network when working remotely. By applying the aforementioned clustering and cluster naming techniques, cluster name 1002 may be generated. The words in cluster name 1002 are ones that appear relatively frequently in the chat requestor text.

B. Determining Similarities Between Clusters and Existing Conversation Flows

Once the clusters have been defined from the set of online chat records, a similarity metric can be used to compare texts (e.g., names) associated with the clusters with text strings (e.g., canonical questions and statements) contained within the existing pre-defined virtual agent conversation flows. The texts associated with a particular cluster could include at least a portion of the text from one or more of the online chat records that are assigned to the particular cluster. In some examples, the similarity metric could be based on term frequencies within the texts associated with the clusters (e.g., TF-IDF values for terms in the cluster texts) and the text strings contained within the pre-defined virtual agent conversation flows. Additionally or alternatively, the similarity metric could be based on vector representations (e.g., word vector representations) of the online chat records and further vector representations of the text strings contained within the pre-defined virtual agent conversation flows (e.g., the similarity metric could be based on distances, within a multi-dimensional semantic space, between such vector representations).

The similarity metric could be based on a similarity metric used to generate the clusters or could be a different metric. For example, the similarity metric used to compare the clusters to the existing pre-defined virtual agent conversation flows could be based on term frequencies within the texts associated with the clusters and the text strings contained within the pre-defined virtual agent conversation flows, and the clusters could be determined based on similarity between vector representations of the online chat records in a p-dimensional vector space.

Once the similarity metric has been used to compare the texts associated with the clusters with text strings contained within the existing pre-defined virtual agent conversation flows, the comparisons could be used to identify one (or more) of the clusters to recommend for generation of a new virtual agent conversation flow. This can include identifying a cluster that has less than a threshold similarity, according to the similarity metric, with each of the existing pre-defined virtual agent conversation flows. This identification and/or recommendation can be limited only to those clusters to which are assigned at least a threshold number of online chat records, in order to allocate human technicians to those problems that not so rare as to not be worth the effort of generating a new virtual agent conversation flow.

Figure 10B:
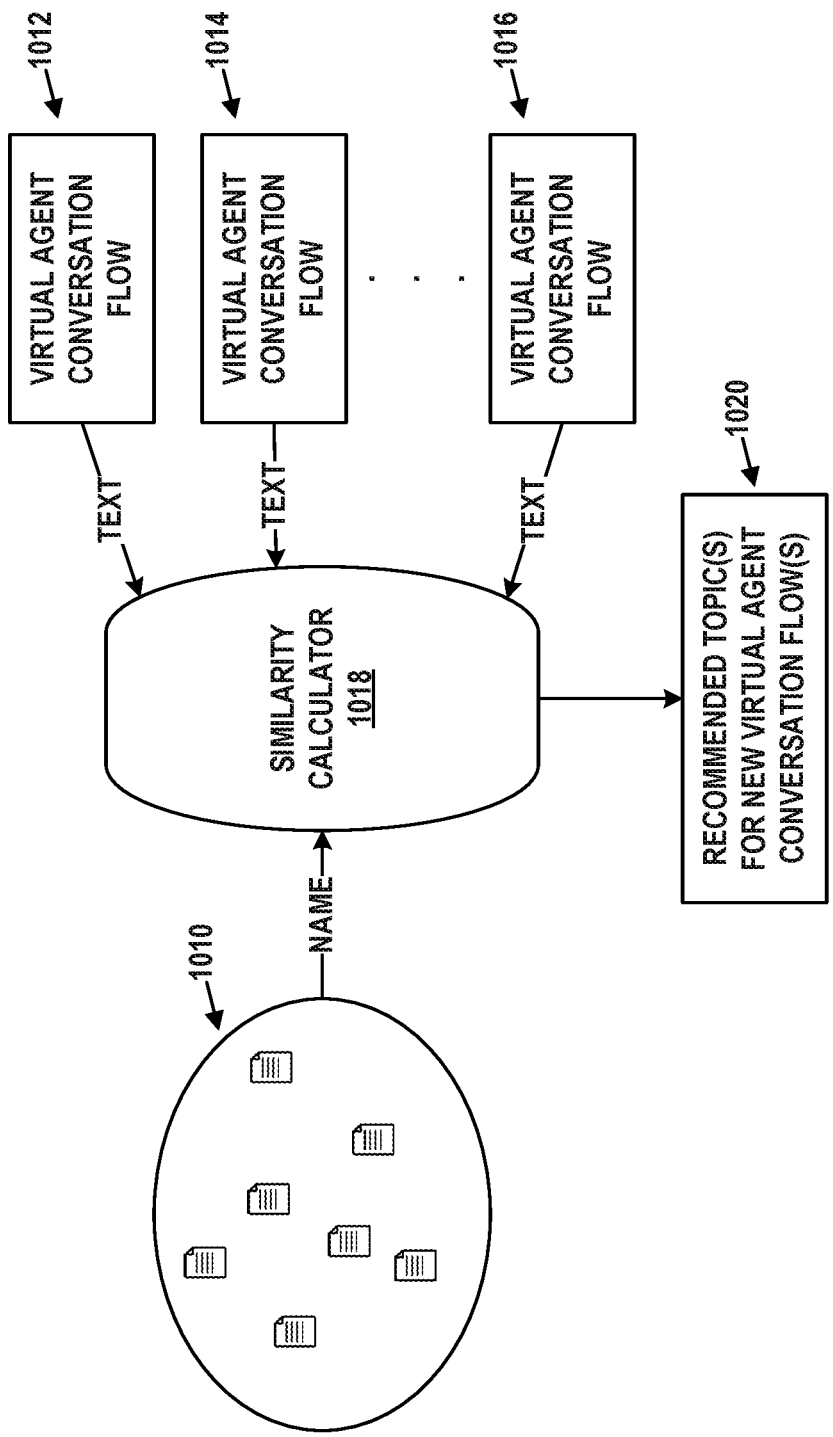
FIG. 10B depicts recommending one or more topics for virtual agent conversation flows, in accordance with example embodiments.

FIG. 10B provides an illustrative example of this process. Cluster 1010 contains a number of online chat records grouped by similarity. Virtual agent conversation flows 1012, 1014, 1016 are pre-defined and contain respective text. Similarity calculator 1018 receives the name (or other constituent text) of cluster 1010, as well as the text from virtual agent conversation flows 1012, 1014, 1016, and then compares the name to the text of each flow to determine similarities therebetween. If all of the resulting similarities are below a predetermined threshold, then at block 1020 the system recommends one or more topics for development new virtual agent conversation flow. These topics may be based on the name of cluster 1010.

C. Example Operations

Figure 10C:
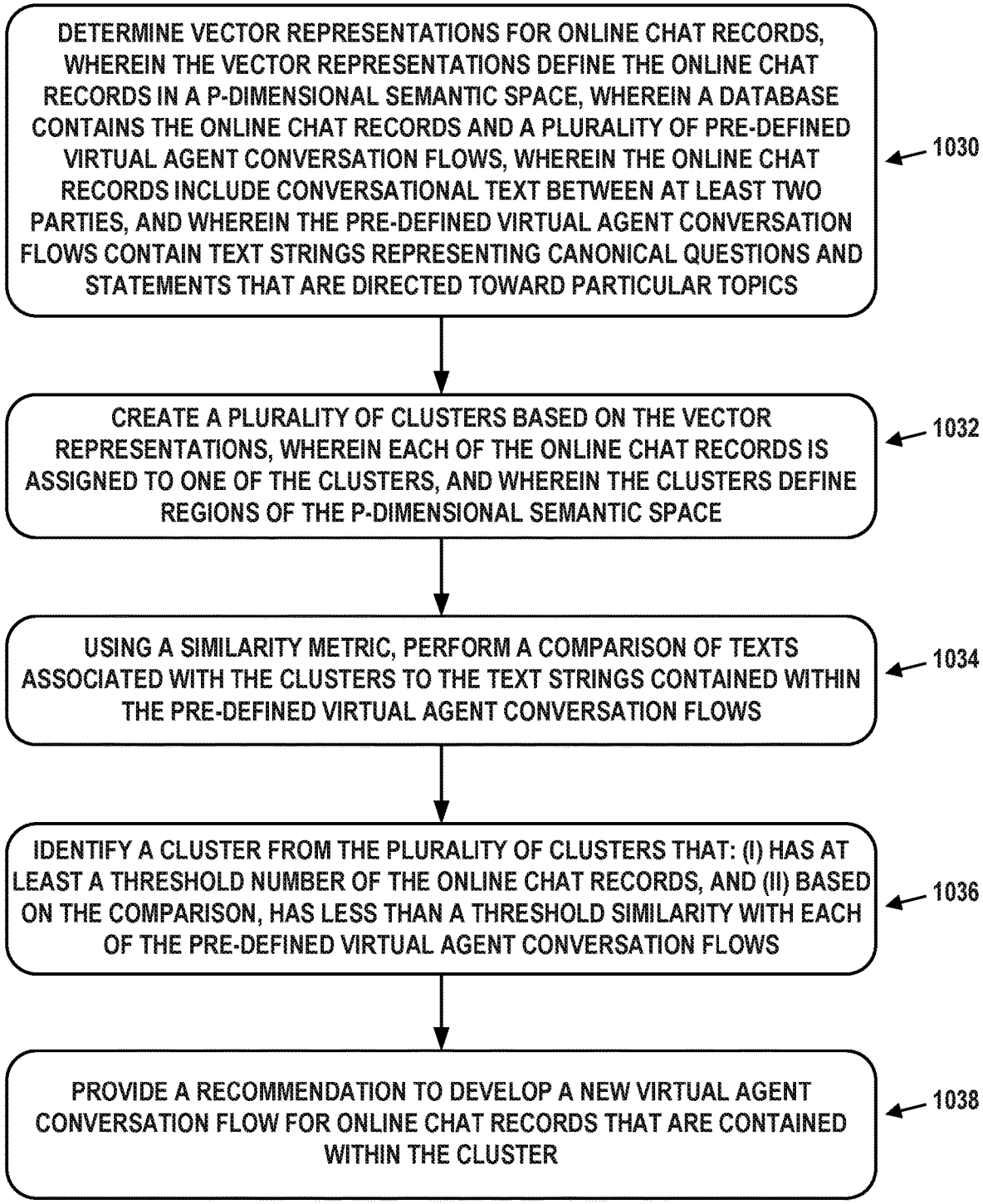
FIG. 10C is a flow chart, in accordance with example embodiments.

FIG. 10C is a flow chart illustrating an example embodiment. The process illustrated by FIG. 10C may be carried out by a computing device, such as computing device 100, and/or a cluster of computing devices, such as server cluster 200, perhaps in the context of a computational instance. However, the process can be carried out by other types of devices or device subsystems. For example, the process could be carried out by a portable computer, such as a laptop or a tablet device.

Block 1030 may involve determining vector representations for online chat records, wherein the vector representations define the online chat records in a p-dimensional semantic space, wherein a database contains the online chat records and a plurality of pre-defined virtual agent conversation flows, wherein the online chat records include conversational text between at least two parties, and wherein the pre-defined virtual agent conversation flows contain text strings representing canonical questions and statements that are directed toward particular topics.

Block 1032 may involve creating a plurality of clusters based on the vector representations, wherein each of the online chat records is assigned to one of the clusters, and wherein the clusters define regions of the p-dimensional semantic space.

Block 1034 may involve, using a similarity metric, performing a comparison of texts associated with the clusters to the text strings contained within the pre-defined virtual agent conversation flows.

Block 1036 may involve identifying a cluster from the plurality of clusters that: (i) has at least a threshold number of the online chat records, and (ii) based on the comparison, has less than a threshold similarity with each of the pre-defined virtual agent conversation flows.

Block 1038 may involve providing a recommendation to develop a new virtual agent conversation flow for online chat records that are contained within the cluster.

In some embodiments, the texts associated with the clusters include at least a portion of the conversational text from the online chat records.

In some embodiments, the one or more processors are further configured to assign textual descriptions to each of the clusters based on frequencies of words therein, wherein the texts associated with the clusters include the textual descriptions.

In some embodiments, the similarity metric is based on term frequencies within the texts associated with the clusters and the text strings contained within the pre-defined virtual agent conversation flows.

In some embodiments, the similarity metric is based on the vector representations of the online chat records and further vector representations of the text strings contained within the pre-defined virtual agent conversation flows.

In some embodiments, determining vector representations for each of the online chat records comprises determining vector representations for an initial 1-10 user inputs from each of the online chat records.

In some embodiments, the threshold number of online chat records is at least 5, at least 10, or at least 25.

In some embodiments, providing the recommendation to develop the new virtual agent conversation flow for online chat records that are contained within the cluster involves providing indications of an identity the cluster and text associated with the cluster.

Some embodiments may further involve: (i) receiving the new virtual agent conversation flow for online chat records that are contained within the cluster; and (ii) storing, in the database, the new virtual agent conversation flow for online chat records that are contained within the cluster and rules for triggering execution of the new virtual agent conversation flow.

Some embodiments may further involve: (i) identifying textual user input associated with a chat request that involves a particular topic; and (ii) initiating execution a particular one of the pre-defined virtual agent conversation flows that is directed toward the particular topic.

In some embodiments, the pre-defined virtual agent conversation flows contain linear or tree-based representations of conversation flows.

X. CREATION AND REMOVAL OF KNOWLEDGEBASE ARTICLES BASED ON INCIDENT REPORTS

As noted previously, a remote network management platform may incorporate databases of incident reports and knowledgebase articles. One way of considering the roles of these different types of information is that incident reports generally indicate specific difficulties that technology users have experienced at a particular point in time (and possibly solutions thereto), while knowledgebase articles indicate procedures and more general descriptions of how to avoid or solve certain common difficulties, as well as workflows, tutorials, and explanations related to use of technology in an enterprise.

In other words, incident reports relate to a specific issue experienced by a specific user. If multiple users are experiencing the same or a similar issue, multiple incident reports related to that issue may be present in the incident report table or database. But generally, these incident reports have a limited useful lifetime, measured in hours or days. Once a particular issue is addressed, the incident report is closed and may never be viewed again unless the same or a similar issue is experienced by other users and the incident report table or database is searched for solutions. In many cases, the information in incident reports is somewhat ad hoc and may not contain a complete description of the issue or the solution.

But knowledgebase articles are intended to have a much longer useful lifetime, measured in weeks, months or years. Thus, they are written to serve a more pedagogical purpose, and usually consist of at least several paragraphs, and perhaps flow charts, images, lists of URLs referencing relevant information, and so on.

In some situations, a knowledgebase article may be written to address common issues from incident reports. For example, if a large number of users have been opening incident reports indicating that they do not know how to reset their passwords, IT personnel or other individuals may write a detailed knowledgebase article to guide the users step-by-step through the password reset process. A link to this article may be emailed to all users, to new users, or to users that open incident reports requesting password reset assistance. Having such knowledgebase articles at hand may result in fewer incident reports being opened, and less time being spent to resolve certain incidents.

For example, when a user opens an incident report, the enterprise's computational instance may use one or more similarity metrics (e.g., based on term frequencies, word vectors, paragraph vectors, and/or clustering) to determine one or more knowledgebase articles with similar content. Links to these articles may be automatically provided to the user or automatically added to the incident report. The user may then find that one of the knowledgebase articles addresses his or her issue and mark the incident report closed. Alternatively, if the incident report is kept open, the IT personnel assigned to the incident report may view the linked knowledgebase articles in order to rapidly determine a resolution to the incident report. In either situation, time and effort are reduced.

When accessed, knowledgebase articles may be presented to users by way of a web-based interface, perhaps accessible via their enterprise's computational instance. Thus, whether or not in the context of incident report, users and IT personnel may be able to search knowledgebase articles for assistance with technology issues. But, as an enterprise grows, the number of articles in its knowledgebase may increase accordingly. As a result, it may become harder for the knowledgebase search engine to return concise lists of the most relevant articles.

The embodiments described in this section recognize that there can be information in an enterprise's incident report table or database that may be useful for the curation and management of knowledgebase articles. To that point, these embodiments address two distinct issues: (i) identifying when new knowledgebase articles should be written based on common issues found in recent incident reports, and (ii) identifying when old knowledgebase articles can be retired because the issues they cover do not appear in a significant number of recent incident reports. In this fashion, rapidly-evolving incident report content is used to drive the more slowly-evolving knowledgebase content.

Herein, "recent" incident reports may be those opened, updated, or closed within a pre-determined number of days, weeks, months, quarters, years, etc. from the present time. For example, in the embodiments described below, only incident reports from the last 3 months, 6 months, or 12 months might be considered. Older incident reports might be deemed to be "stale," in that the issues to which they pertain are less likely to be relevant due to the age of the incident report.

As an example, consider an enterprise that carries out a migration from version A of an operating system to version B of the operating system across 10,000 of its computing devices. Prior to the migration, the enterprise's knowledgebase may contain numerous articles regarding the operation and quirks of version A of the operation system that do not apply to version B of the operating system. Therefore, as the migration progresses, these knowledgebase articles are expected to gradually become less relevant until they are not relevant at all to the enterprise at the end of the migration. This lack of relevance may be reflected in fewer and fewer incident reports being similar to the outdated knowledgebase articles.

Conversely, version B of the operating system may have its own set of operational behaviors and quirks that are not present in version A. Thus, beginning around the time of the migration, more and more incident reports may seek assistance with these behaviors and quirks. As a result, it may be beneficial to develop new knowledgebase articles to describe solutions to the issues specific to version B of the operating system.

A. Incident Report/Knowledgebase Article Similarity

Figure 11A:
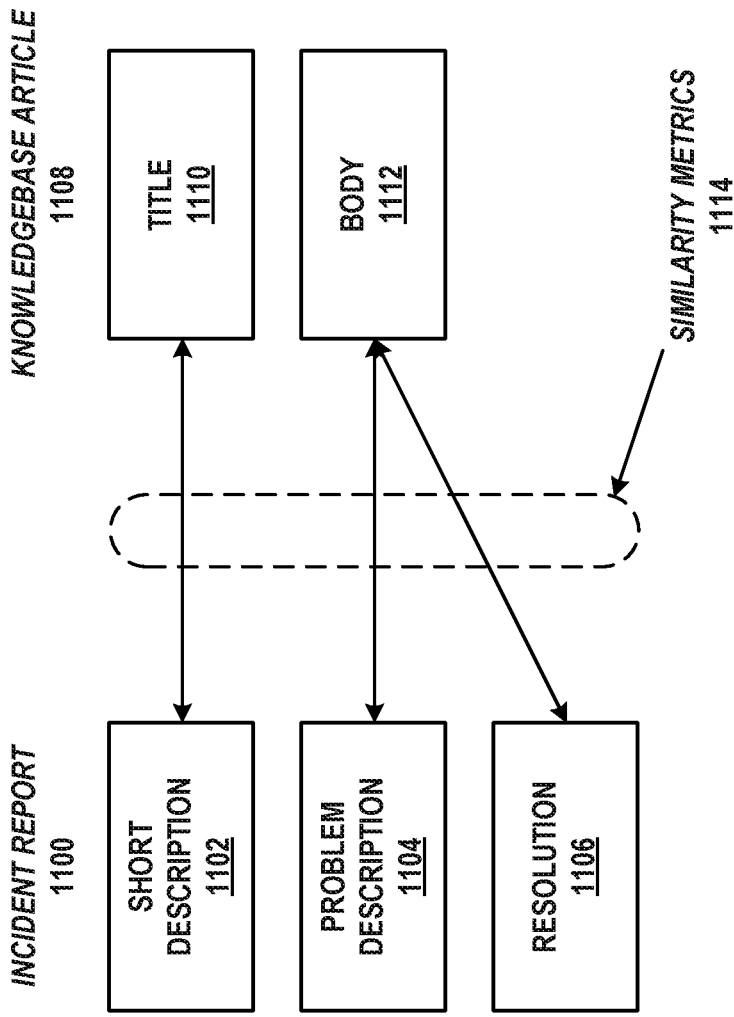
FIG. 11A depicts comparing incident reports to knowledgebase articles, in accordance with example embodiments.

FIG. 11A is a visual representation of various similarity calculations that can occur between an incident report and a knowledgebase article. Particularly, incident report 1100 contains short description 1102, problem description 1104, and resolution 1106, among other fields. Likewise, knowledgebase article 1108 contains title 1110 and body 1112. Similarity metrics 1114, which may be based on term frequencies, word vectors, paragraph vectors, and/or clustering, can be applied to various combinations of these fields.

As just one possible example, paragraph vectors may be calculated for the short description 1102 and title 1110, perhaps using a plurality of incident reports and/or knowledgebase articles as the corpus of source documents. Then, the similarity of these paragraph vectors may be calculated, e.g., using cosine similarity, Euclidian distance, or some other example of similarity metrics 1114. If the result is greater than a pre-determined threshold, the incident report 1100 and knowledgebase article 1108 may be designated as similar to one another.

Alternatively or additionally, paragraph vectors may be calculated for problem description 1104 and body 1112, for resolution 1106 and body 1112, or for: (i) a combination of problem description 1104 and resolution 1106 and (ii) body 1112. In some enterprises, it is common practice to copy-and-paste parts of the body of a relevant knowledgebase article into the problem description or resolution of an incident report. Thus, these alternatives may facilitate discovering knowledgebase articles with a high degree of similarity to an incident report.

In some embodiments, word vectors or term frequency metrics may be used for the similarity calculations. As word vectors operate on individual words rather than groups of words, an aggregation of individual word vector embeddings (e.g., a summation or weighted average) may be used to represent a group of words in the vector space.

B. Identifying New Article Candidates

Figure 11B:
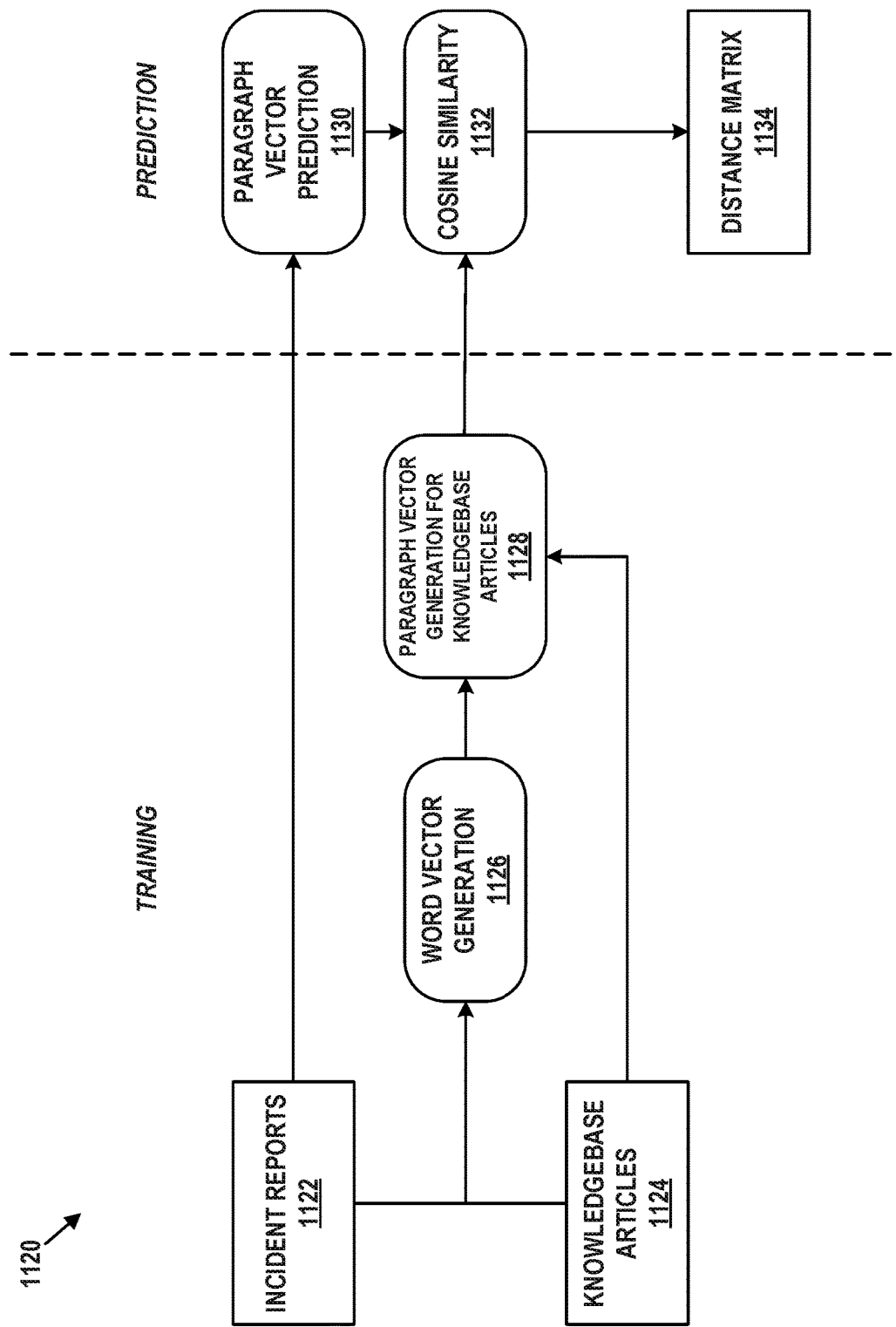
FIG. 11B depicts training and depiction of a system for comparing incident reports to knowledgebase articles, in accordance with example embodiments.

FIG. 11B depicts an example implementation for identifying new knowledgebase article candidates based on the content of incident reports. This implementation uses word vectors, paragraph vectors, term frequencies, and clustering in various aspects.

During training, all fields of text in incident reports 1122 and knowledgebase articles 1124 are concatenated and used at step 1126 to generate a word vector model. In some embodiments, fewer than all fields can be used. Then, at step 1128 and based on the word vector model, a paragraph vector model is generated. Based on this model, a paragraph vector is generated for each of knowledgebase articles 1124.

During prediction, a paragraph vector is inferred for each of incident reports 1122 at step 1130. Though not shown in FIG. 11B for purposes of simplicity, step 1130 uses at least part of the paragraph vector models from step 1128. Then, step 1132 involves determining cosine similarities over the paragraph vector representations for each pair of incident reports 1122 and knowledgebase articles 1124.

The result is distance matrix 1134, which is a two-dimensional grid with entries for the cosine similarities that are indexed by the incident reports 1122 and knowledgebase articles 1124, respectively. From distance matrix 1134, one can determine: (i) the most similar knowledgebase article(s)

for each incident report, (ii) whether any knowledgebase articles have more than a threshold similarity with a particular incident report, (iii) whether any incident reports have more than a threshold similarity with any knowledgebase articles, and (iv) other useful information.

When distance matrix 1134 indicates that there are incident reports without any sufficiently similar knowledgebase articles (e.g., below a threshold similarity), it is likely that these incident reports are unsupported by any articles in the knowledgebase. Thus, it may be advantageous for new knowledgebase articles to be developed (i.e., written) based on these unsupported incident reports.

But it may not be efficient, or even useful, to develop a knowledgebase article for every single unsupported incident report. Instead, unsupported incident reports can be clustered based on their semantic content. For clusters with more than a threshold number of incident reports, the semantic content of the incident reports therein may be used to suggest a topic for a new knowledgebase article.

Figure 11C:
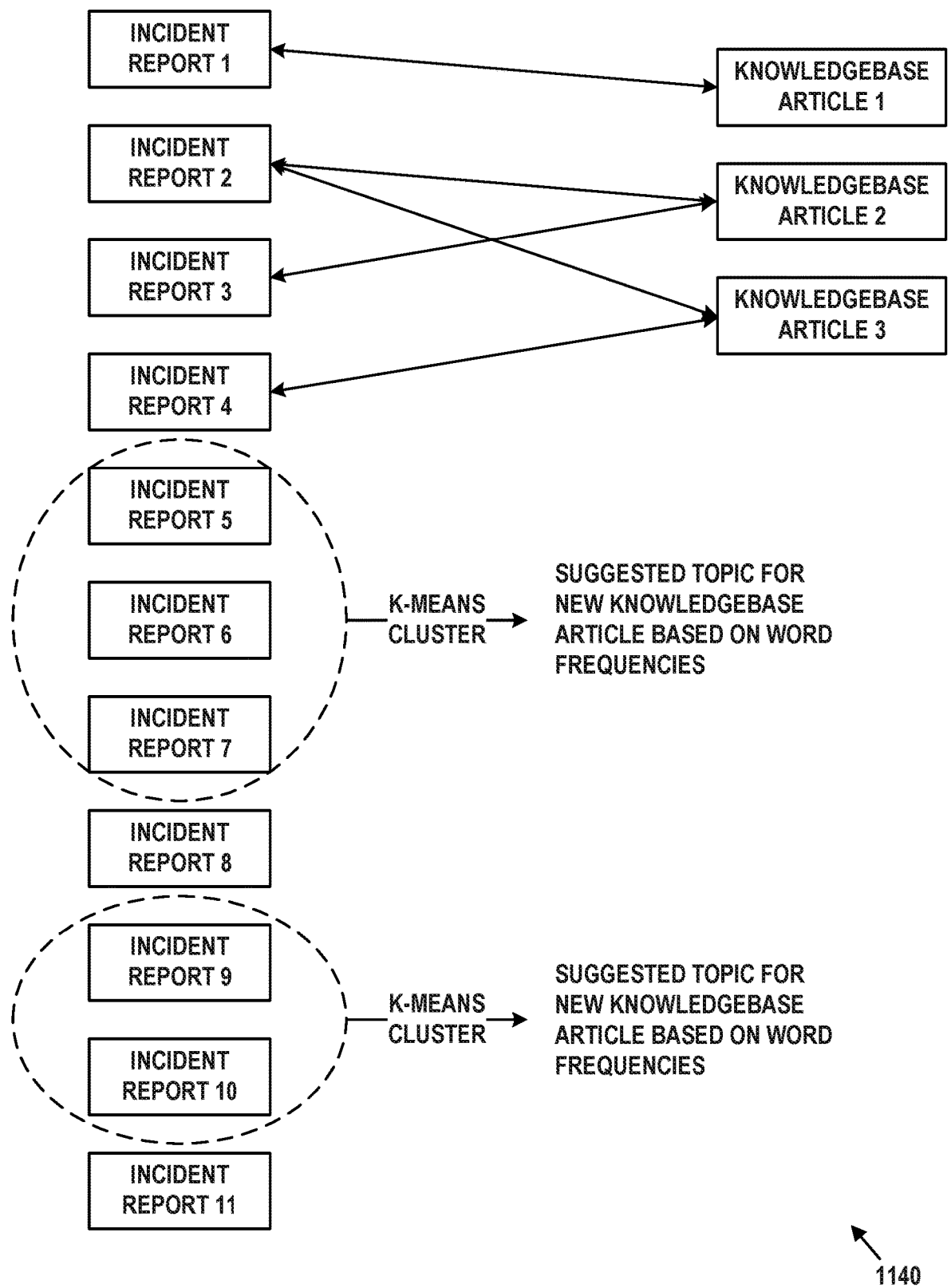
FIG. 11C depicts clustering incident reports unserved by existing knowledgebase articles, in accordance with example embodiments.

A possible embodiment is depicted in FIG. 11C. Arrangement 1140 includes 11 incident reports and 3 knowledgebase articles, and illustrates a possible use of distance matrix 1134 for these incident reports and knowledgebase articles.

Particularly, incident report 1 has greater than a threshold similarity with knowledgebase article 1 (as indicated by the arrow connecting these items). Therefore incident report 1 is supported by knowledgebase article 1, and knowledgebase article 1 can be associated with incident report 1 in some fashion reflecting this similarity. Incident report 2 has greater than the threshold similarity with knowledgebase articles 2 and 3 (as indicated by the arrows connecting incident report 2 with knowledgebase articles 2 and 3, respectively). Therefore incident report 2 is supported by knowledgebase articles 2 and 3, and knowledgebase articles 2 and 3 may be associated with incident report 2. Incident report 3 has greater than the threshold similarity with knowledgebase article 2, and is associated therewith (as indicated by the arrow connecting these items). Incident report 4 has greater than the threshold similarity with knowledgebase article 3, and is associated therewith (as indicated by the arrow connecting these items). In general, one incident report can be associated in this manner with multiple knowledgebase articles, and one knowledgebase article can be associated with multiple incident reports.

In contrast, incident reports 5, 6, 7, 8, 9, 10, and 11 do not have the threshold degree of similarity with any of the knowledgebase articles. Based on this determination, a clustering technique may be applied to these incident reports. This clustering technique may exhibit any of the properties in the discussion of clustering above, and k-means clustering is used as an example in FIG. 11C. As shown, the result of clustering is that incident reports 5, 6, and 7 form one cluster, while incident reports 9 and 10 form another cluster. Incident reports 8 and 11 remain outside of the boundaries for any cluster.

In accordance with the discussion of cluster naming above, the set of n words most frequently appearing in each of these clusters may be found (e.g., using TF-IDF or some other mechanism to determine word stems), and a name of the cluster may be suggested based on these n words. In various embodiments, n may take on any value between 1 and 10, inclusively. For example, where n is 3, the cluster containing incident reports 5, 6, and 7 may have the most frequently appearing words "password", "login", and "reset", while the cluster containing incident reports 9 and 10 may have the most frequently appearing words "filter", "spam", and "email". In the case that less than n words are determined to be the most frequent, then fewer than n words can be suggested as a cluster's name. Regardless, the name may be a concatenation of the n words for each cluster.

In any event, the suggested names for each cluster can also be used as suggested topics for a new knowledgebase articles. For example, the cluster name "password login reset" may suggest that a knowledgebase article be written on the topic of how users can reset their enterprise passwords. Additionally, the cluster name "filter spam email" may suggest that a knowledgebase article be written on the topic of how users can access emails held by a spam filter and possibly change the sensitivity, blacklist, and/or whitelist settings of such a filter.

In some cases, such a suggestion is only made for clusters of at least a certain size. This size may be 2, 3, 5, 10, 25, 50, 100 incident reports, or may take on a different value.

Once a suggested knowledgebase article topic is found, it may be stored and/or presented to IT personnel. For example, a work item may be automatically generated for a particular party (e.g., an IT manager) to determine whether such an article based on this topic should be written. If the decision is for the article to be written, this work item can be assigned to an appropriate individual for development of the article.

There are several possible variations for identification of candidate knowledgebase articles. Some possible variations involve inferring paragraph vectors on different fields of incident reports and knowledgebase articles in a sequential fashion. These approaches may increase coverage, as well as identify exact duplicates and copy-and-paste scenarios.

For example, one variation involves the following five step process. First, paragraph vectors are determined for incident report short descriptions and knowledgebase article titles. A first distance matrix is calculated based on the similarities of the incident report paragraph vectors and the knowledgebase article paragraph vectors, and similarities between incident reports and knowledgebase articles are determined therefrom. This step is fast to implement and provides broad coverage.

Second, for any remaining incidents below a threshold degree of similarity with all knowledgebase articles as indicated by the first distance matrix, paragraph vectors are determined for incident report short descriptions and knowledgebase article text (e.g., title and body or just body). A second distance matrix is calculated based on the similarities of the incident report paragraph vectors and the knowledgebase article paragraph vectors, and similarities between incident reports and knowledgebase articles are determined therefrom.

Third, for any remaining incidents below a threshold degree of similarity with all knowledgebase articles as indicated by the second distance matrix, paragraph vectors are determined for incident report problem descriptions (and/or resolutions) and knowledgebase article titles. A third distance matrix is calculated based on the similarities of the incident report paragraph vectors and the knowledgebase article paragraph vectors, and similarities between incident reports and knowledgebase articles are determined therefrom.

Fourth, for any remaining incidents below a threshold degree of similarity with all knowledgebase articles as indicated by the third distance matrix, paragraph vectors are determined for incident report problem descriptions (and/or resolutions) and knowledgebase article text (e.g., title and body or just body). A fourth distance matrix is calculated based on the similarities of the incident report paragraph vectors and the knowledgebase article paragraph vectors, and similarities between incident reports and knowledgebase articles are determined therefrom. This step may be useful in determining where knowledgebase article text was copied-and-pasted into an incident report.

Notably, the threshold degrees of similarity may be different at each step of this variation.

After these four steps are carried out, all remaining incident reports that have not been determined to be similar to at least one knowledgebase article are clustered, the clusters are named, and the cluster names are used to generate suggestions for new knowledgebase articles, all as described above.

C. Identifying Candidate Articles for Retirement

Comparable techniques involving the calculation of paragraph vectors over incident reports and knowledgebase articles may be used to identify knowledgebase articles that have less than a threshold similarity with all incident reports under consideration. These knowledgebase articles are likely to have a topic that is no longer relevant to the enterprise, or at least of limited relevance compared to others. Thus, the knowledgebase articles identified may be retired—e.g., deleted, removed from the knowledgebase, or flagged as being of a low relevance. Any knowledgebase articles flagged as having low relevance may be demoted in search results so that they do not appear as high as they otherwise would in listings of search results or so that they do not appear in the search results at all.

Figure 11D:
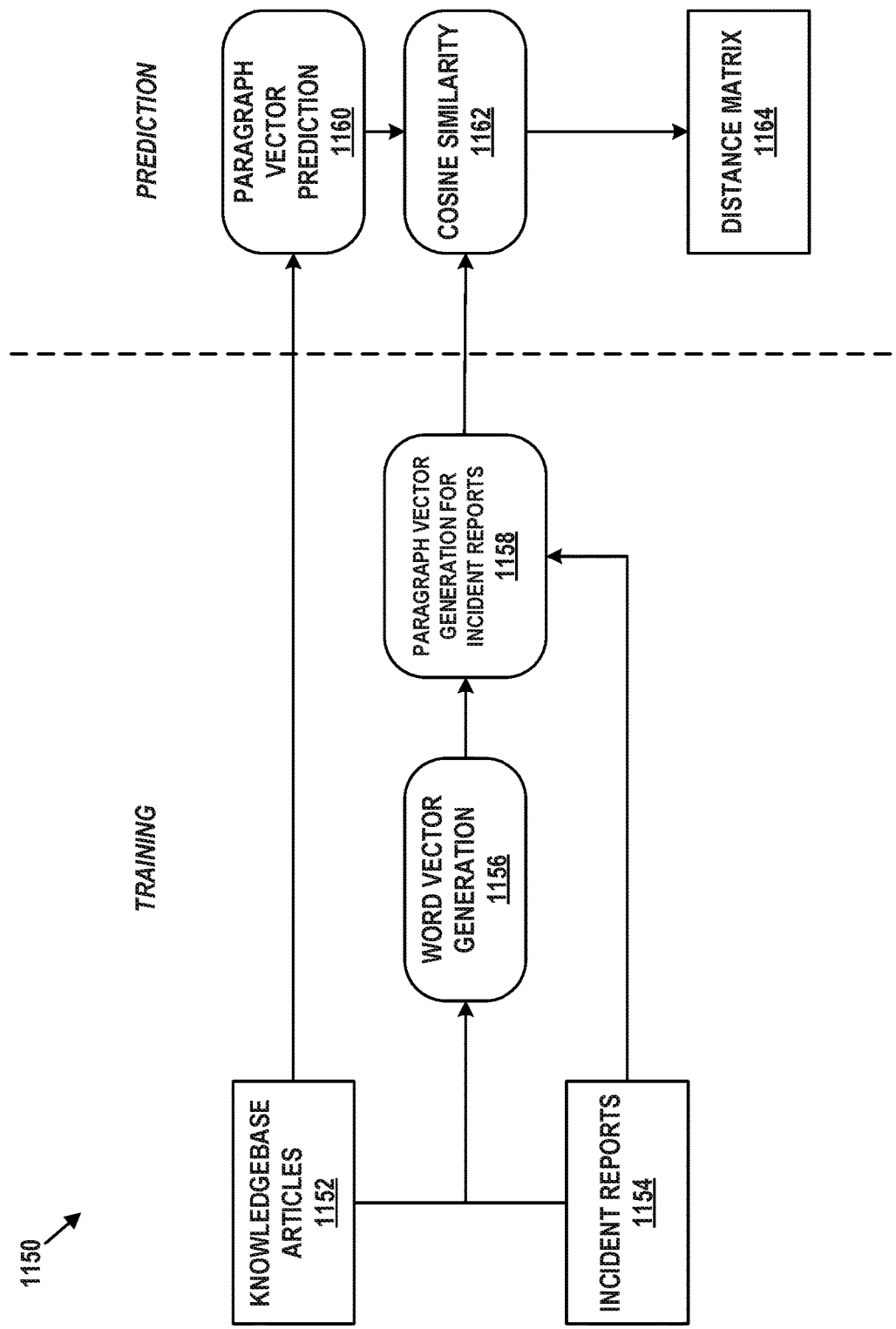
FIG. 11D depicts training and depiction of another system for comparing incident reports to knowledgebase articles, in accordance with example embodiments.

FIG. 11D depicts an example implementation 1150 of this process in more detail. During training, all fields of text in knowledgebase articles 1152 and incident reports 1154 are concatenated and used at step 1156 to generate a word vector model. In some embodiments, fewer than all fields can be used. Then, at step 1158 and based on the word vector model, a paragraph vector model is generated. Based on this model, a paragraph vector is generated for each of incident reports 1154.

During prediction, a paragraph vector is inferred for each of knowledgebase articles 1152 at step 1160. Though not shown in FIG. 11D for purposes of simplicity, step 1160 uses at least part of the paragraph vector model from 1158. Then, step 1162 involves determining cosine similarities over the paragraph vector representations for each pair of knowledgebase articles 1152 and incident reports 1154.

The result is distance matrix 1164, which is a two-dimensional grid with entries for the cosine similarities indexed by knowledgebase articles 1152 and incident reports 1154, respectively. From distance matrix 1164, one can determine: (i) the most similar incident report(s) for each knowledgebase article, (ii) whether any incident reports have more than a threshold similarity with a particular knowledgebase article, (iii) whether any knowledgebase articles have more than a threshold similarity with any incident reports, and (iv) other useful information.

Thus, distance matrix 1164 can be scanned for each knowledgebase article to determine whether it is below a threshold similarity with each of the incident reports. If that is the case, the knowledgebase article may be flagged for retirement.

Once such a knowledgebase article is found, it may be presented to IT personnel. For example, a work item may be automatically generated for a particular party (e.g., an IT manager) to determine whether such an article should be retired. If the decision is for the article to be retired, it may be deleted, removed from the knowledgebase, or demoted in search results as described above. In some cases, an article that is removed from the knowledgebase may be once again relevant if it exhibits greater than a threshold similarity with one or more new incident reports.

D. Example Operations

FIG. 11E is a flow chart illustrating an example embodiment. The process illustrated by FIG. 11E may be carried out by a computing device, such as computing device 100, and/or a cluster of computing devices, such as server cluster 200, perhaps in the context of a computational instance. However, the process can be carried out by other types of devices or device subsystems. For example, the process could be carried out by a portable computer, such as a laptop or a tablet device.

Block 1170 may involve selecting a subset of incident reports that are associated with dates within a pre-determined window of time, wherein a database contains the incident reports and a knowledgebase, wherein the incident reports include text-based fields that document technology-related problems experienced by users of a managed network, and wherein the knowledgebase contains articles textually describing a subset of the technology-related problems.

Block 1172 may involve determining vector representations for each of the subset of the incident reports, wherein the vector representations characterize the incident reports in a p-dimensional semantic space.

Block 1174 may involve calculating similarity metrics between the vector representations and further vector representations that characterize the articles in the p-dimensional semantic space.

Block 1176 may involve determining, based on the similarity metrics, that a particular article of the articles has less than a first threshold semantic similarity with the subset of the incident reports.

Block 1178 may involve providing an indication that the particular article is a candidate for removal from the knowledgebase.

Some embodiments may involve: (i) receiving an instruction to remove the particular article from the knowledgebase; and (ii) deleting the particular article from the knowledgebase.

Some embodiments may involve: (i) receiving an instruction to remove the particular article from the knowledgebase; and (ii) retiring the particular article so that it does not appear in subsequent search results of the knowledgebase.

Some embodiments may involve: (i) determining, based on the similarity metrics, that: (a) a cluster of incident reports within the subset of the incident reports each has less than a second threshold semantic similarity with the articles, and (b) the vector representations of the cluster of incident reports are located within a region of a q-dimensional semantic space; (ii) determining a set of n words most frequently appearing in the cluster of incident reports; and (iii) providing the set of n words as a basis for development of a new article related to the cluster of incident reports. In some cases, q is p. and thus two different semantic spaces are used—one for similarity, the other for cluster determination.

In some embodiments, determining the set of n words most frequently appearing in the cluster of incident reports comprises: (i) creating a corpus of text from one or more of the text-based fields in the cluster of the incident reports; (ii) preprocessing the corpus of text by removing stop-words and punctuation; (iii) mapping words in the corpus of text to word stems, wherein one or more of the words in the corpus of text is mapped to each word stem; (iv) determining a set of n word stems most frequently-appearing in the corpus of text as mapped; and (v) determining the set of n words as those respectively corresponding to the n word stems, wherein the each of the set of n words is a shortest word form of the words in the corpus of text that map to the respectively corresponding word stem.

In some embodiments, a dictionary associates vocabulary words to respective vocabulary word stems, and mapping the words in the corpus of text to word stems comprises looking up, in the dictionary, the words in the corpus of text to determine the word stems.

In some embodiments, mapping the words in the corpus of text to word stems comprises removing suffixes from the words in the corpus of text, wherein the suffixes removed include 's', 'es', 'ed', 'ing', and 'ly'.

In some embodiments, the shortest word form has a least number of letters of all word forms of the words in the corpus of text that map to the respectively corresponding word stem.

In some embodiments, n is between 1 and 5 inclusive.

In some embodiments, the text-based fields include a short description, a problem description, and a resolution, and the vector representations are determined from one or more of the short description, the problem description, or the resolution.

In some embodiments, the similarity metrics represent distances in the p-dimensional semantic space between pairs of the vector representations.

In some embodiments, the pre-determined window of time is within a most-recent month, quarter, or year.

In some embodiments, the articles provide solutions for the subset of the technology-related problems.

XI. RECOMMENDING SKILLS BASED ON INCIDENT REPORTS

As noted previously, an enterprise may use a computational instance of a remote network management platform to handle certain IT activities. The computational instance may contain one or more databases that include, among other items, incident reports.

Ideally, each submitted incident report is addressed in a timely fashion so that user downtime is reduced and productivity is increased. But in order for incident reports to be examined, resolved, and/or closed, an IT professional with the appropriate skills should be assigned to the incident report. These skills may include, but are not limited to, authentication, networking, security, telephony, email, various operating systems, and various software applications.

When an IT professional does not have the skills necessary to address the incident report, it can have a detrimental impact on the enterprise. For instance, the IT professional may reject the incident report, causing further delay before it can be addressed by an individual with the proper skills. Or even worse, the IT professional may incorrectly address the incident report, and create new problems and/or user confusion in the process. As a consequence, it is desirable for incident reports to be assigned to IT professionals with the appropriate skills.

Doing so, however, is a challenge because many enterprises do not have a way of performing skill-based routing, and some even have incident reporting systems that lack the concept of a skill. Further, even if an enterprise performs skill-based routing, this often occurs based on simplistic descriptions of the skill and uses simplistic matching between words in incident reports and words in skill descriptions.

The embodiments described in this section utilize the advanced techniques described above for determining semantic similarity between incident reports and skills. Additionally, when skill data do not exist in the enterprise's computational instance or if the skill data that do exist are deemed largely not relevant to the content of the incident reports, these embodiments can suggest a set of skills based on a semantic analysis of incident reports.

A. Overview

Figure 12A:
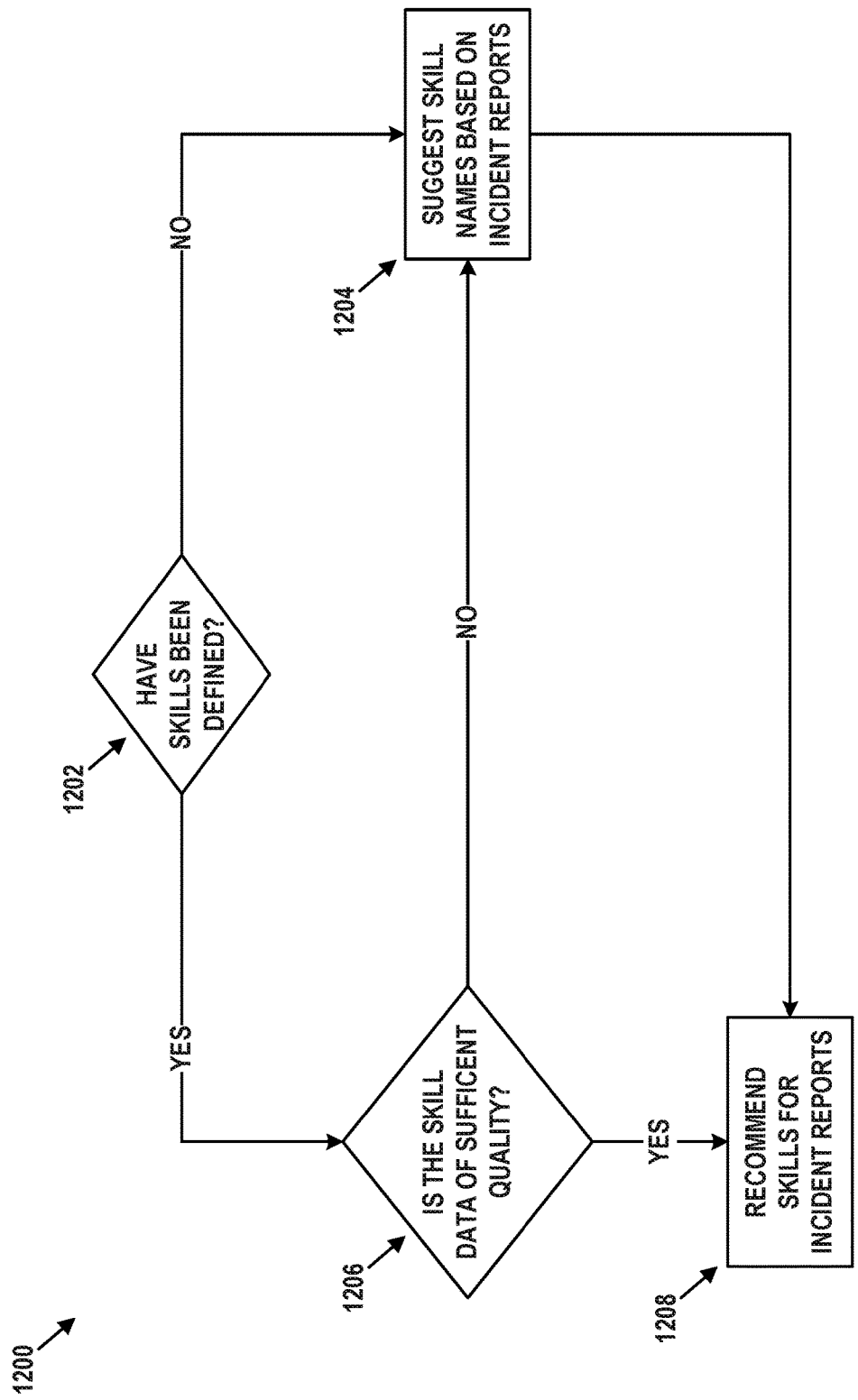
FIG. 12A depicts deriving skill data for association with incident reports, in accordance with example embodiments.

An overview 1200 of the embodiments described in this section is shown in FIG. 12A. These embodiments assume that there is a reasonably rich set of incident reports available in an incident report table or database, and that there is a skills table or database that might or might not be populated.

At step 1202, it is determined whether skills have been defined. In other words, is the skills table or database populated? If the skills table or database is populated, control proceeds to step 1206. If not, control proceeds to step 1204.

At step 1204, skill names are suggested based on the content of incident reports. In particular, incident reports are clustered and these clusters are named based on the frequencies of terms therein. Each cluster name represents one or more possible skills. IT personnel (e.g., an IT manager) may be presented with these proposed skills, and may be able to accept, reject, and/or edit any of them. Accepted skills are used to populate the skill table or database (along with descriptions, in some cases). At the completion of step 1204, control proceeds to step 1208.

At step 1206 it is determined whether the skill data in the table or database is of sufficient quality. This may involve determining a degree of overlap between words in the incident reports and the skill descriptions. In some cases, the degree of overlap may be determined by a Jaccard coefficient. The Jaccard coefficient J(A, B) for two sets A and B is defined as the intersection of A and B divided by the union of A and B. More formally:

$$J(A, B) = \frac{A \cap B}{A \cup B}$$

Thus, step 1206 may determine the count of unique words that appear in both the incident reports and the skill descriptions. This count is divided the number of total unique words that appear in the union of the incident reports and the skill descriptions. The value of the Jaccard coefficient is therefore between 0 and 1, inclusive, with higher values indicating a greater degree of overlap. In practice, skill data maybe determined to be of sufficient quality if the Jaccard coefficient is at least 0.2, 0.3, or 0.4. But other Jaccard coefficient values may be used.

In some cases, all fields of the incident reports are used to determine the Jaccard coefficient. In other cases, a limited number of fields may be used. For example, just the short description, category, problem description, or resolution fields (or some combination thereof) may be used.

If the skill data is not of sufficient quality, control proceeds to step 1204. Otherwise, control proceeds to step 1208.

At step 1208, skills are recommended for incident reports. This may involve using term frequency metrics (e.g., TF-IDF) over the incident reports and skills descriptions to find one or more skills that are sufficiently similar to each incident report. This may involve identifying the top m most similar skills per incident report, or only skills with at least a threshold similarity to each incident report.

The following sections describe this recommendation procedure in more detail. These embodiments use unsupervised machine learning because, in practice, incident reports are rarely tagged with or associated with skill descriptions.

B. Skill Recommendations

Figure 12B:
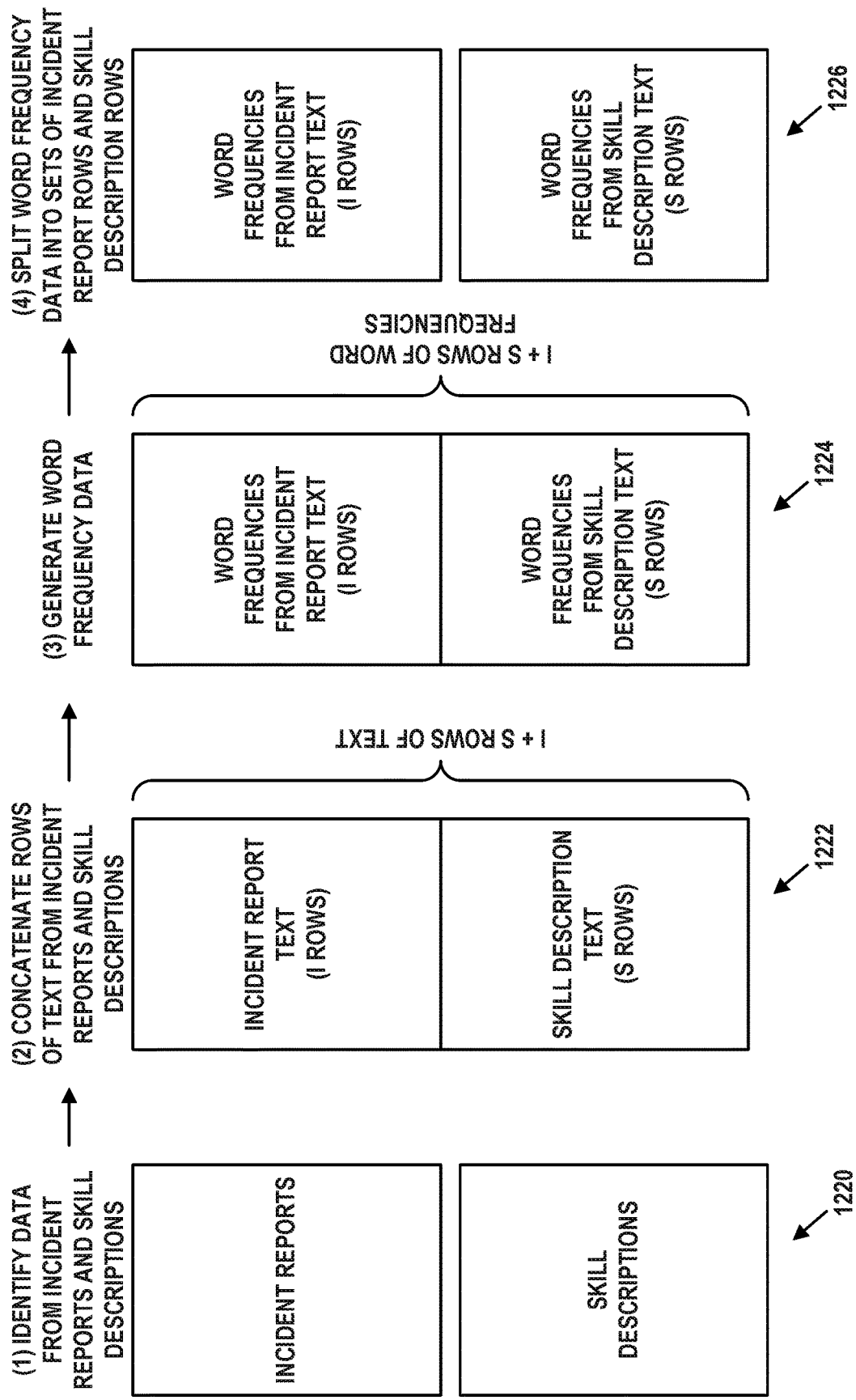
FIG. 12B depicts preparing incident report data and skill data for comparison, in accordance with example embodiments.
Figure 12C:
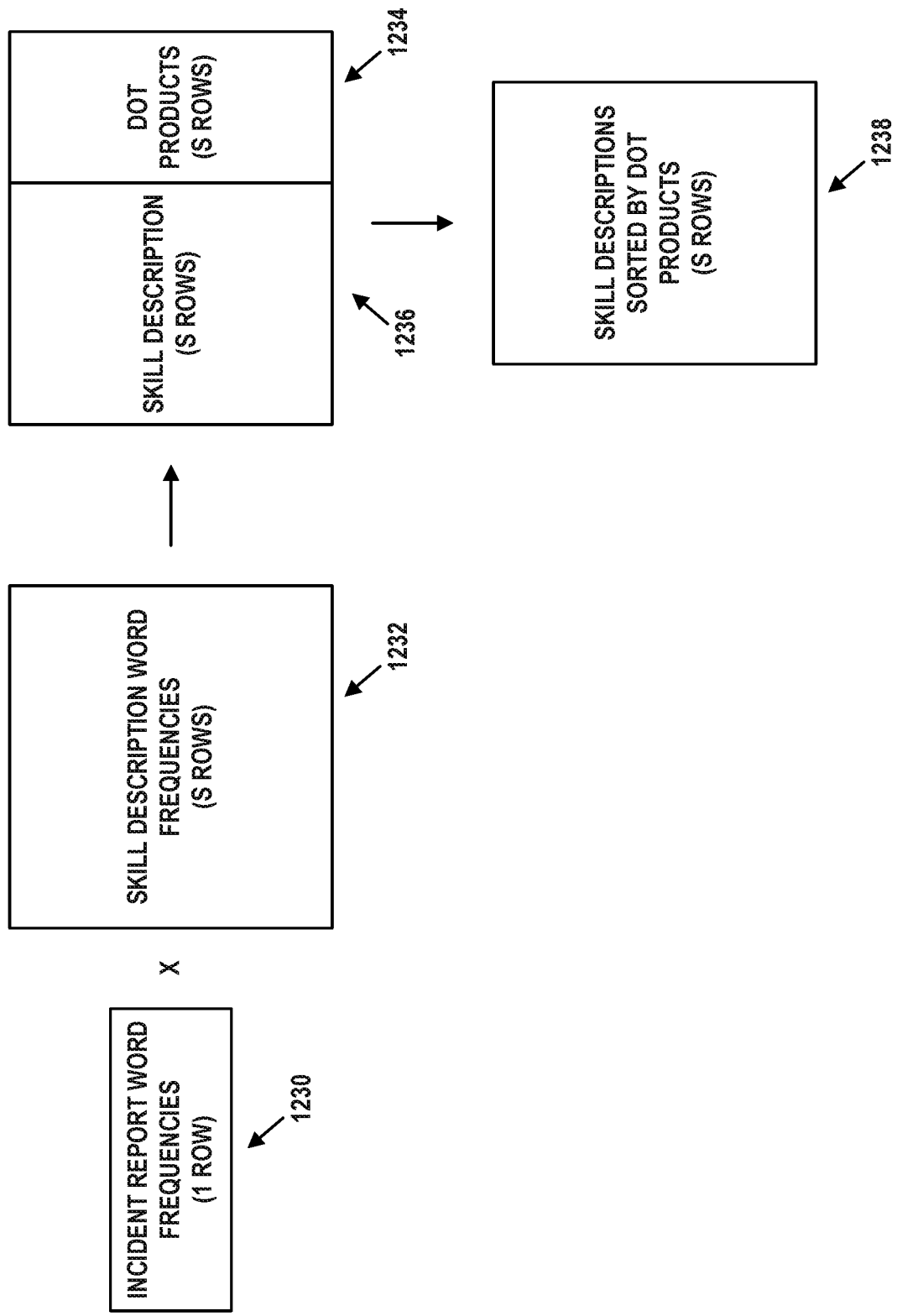
FIG. 12C depicts determining similarities between incident reports and skills, in accordance with example embodiments.

FIGS. 12B and 12C depict a process for identifying a set of most-relevant skills for each of a number of incident reports. In particular, FIG. 12B shows preparatory steps that result in word frequency vectors for incident reports and skill descriptions, and FIG. 12C shows operations that can be performed on these vectors in order to match skills to incident reports.

FIG. 12B depicts four ordered steps. Step 1220 involves identifying data from incident reports and skill descriptions. In some cases, all fields of the incident reports may be considered, while in others only a subset will be considered (e.g., short description, category problem description, and/or resolution). In general, all text from each skill description is considered, though in some cases some words or phrases (e.g., stop-words) may be omitted.

In some cases, the fields considered may vary depending on the lifecycle phase of the incident report. For example, right after the incident report has been created and before it is investigated, only the short description field may have useful information for matching with skill descriptions. Thus, only this field might be used at this point in time. On the other hand, once one fields have been added to the incident report (e.g., category, problem description, resolution), these fields may be used instead of or in addition to the short description field.

Regardless, step 1220 results in i incident reports and s skills being identified. Each may be logically represented as a row. Thus, a row may contain text from an incident report or a skill description.

Step 1222 involves concatenating these rows to form a corpus of text from the i incident reports and s skills.

Step 1224 involves generating word frequency data from the text in the concatenated rows. This may result in a vector of word frequencies for each of the i incident reports and s skills. For example TF-IDF calculations may be performed for each of these rows with the corpus. More specially, the term frequency metric $f_{w,r}$ for a word w in one of the rows r could be determined based on a product of (i) a number of times $c_{w,r}$ that the word appears in the row r, and (ii) a logarithm of a quotient of a count of the rows (i+s) and a count of the rows containing the word ($n_w$). This is illustrated by:

$$f_{w,r} = c_{w,r} \cdot \log \frac{i+s}{n_w}$$

Thus, the p word frequencies for words w0, w1, ..., wp in a given row r can be represented as a vector of numbers:

$$[f_{w0,r}, f_{w1,r}, \ldots, f_{wp,r}]$$

Step 1226 involves splitting the rows of word frequencies generated in step 1224 into i rows for the word frequencies associated with incident reports and s rows for the word frequencies associated with the skill descriptions.

FIG. 12C depicts how one of the i rows 1230, representing word frequencies within a particular incident report, can be multiplied with the s rows 1232, each representing the word frequencies within one of the skill descriptions. In particular, this may involve taking the inner product (e.g., dot product) of a row of rows 1230 with each of rows 1232. A single such inner product can be calculated between two rows a and b as:

$$[f_{w0,a}, f_{w1,a}, \ldots, f_{wp,a}] \begin{bmatrix} f_{w0,b} \\ f_{w1,b} \\ \ldots \\ f_{wp,b} \end{bmatrix} =$$

$$f_{w0,a} \times f_{w0,b} + f_{w1,a} \times f_{w1,b} + \ldots + f_{wp,a} \times f_{wp,b}$$

The higher the value of the inner product, the more similarity between the words in the incident report and the words in the respective skill description. In other embodiments, a cosine similarity may be used.

The s total inner products 1234 may be associated with their corresponding rows of the s rows 1236 of skill descriptions. Then rows 1236 may be sorted by these inner products (e.g., in descending order) to form sorted skill descriptions 1238. This process is repeated for each of the i rows of incident report word frequencies; therefore, one instance of sorted skill descriptions 1238 may exist for each incident report.

For each instance of sorted skill descriptions 1238, skills may be selected for associated with the corresponding incident report. For example, the first m skills in sorted skill descriptions 1238 in the ordering may be deemed to have the most similarity to the incident report and may therefore be associated with that incident report.

In some cases, m may take on a value within the range of 1 to 10, although other ranges are possible. If there are fewer than m skills in sorted skill descriptions 1238, then fewer may be associated with the incident report. In some cases, only skills with an inner product value above a threshold may be associated with the incident report.

When skills are selected in this manner, they may be first presented to IT personnel (e.g., an IT manager) for approval before being associated with the incident report. The IT personnel may have the ability to accept, reject, and/or modify the skills before association.

C. Further Expansion of Skill Descriptions

It is common for some enterprises to have shallow skill descriptions that are either non-existent or very terse. For terse skill descriptions, there only may 1-2 words, which may result in poor skill recommendations for incident reports. Thus, in some embodiments, the skill descriptions can be further expanded by finding similar (e.g., synonymous) words through use of a general vocabulary, other words appearing in incident reports, and/or words appearing in other databases or database tables within the enterprise's computational instance. The expanded skill descriptions are likely to result in higher quality recommendations of skills for incident reports due to a richer vocabulary being used.

This means that, when in step 1206 and the skill data is determined to be of insufficient quality, this skill data may be expanded rather than replaced. In other words, skill data expansion is used instead of step 1204 when the transition is from step 1206.

Regarding general vocabularies, there are some that are publicly available databases that map a large portion of words from a given language (e.g., 200,000 words in English) into a q-dimensional vector representation. One example is GloVe: Global Vectors for Word Representation. From these, contextually similar words can be found by identifying other words with a similar location in the q-dimensional space.

Alternatively or additionally, words in the incident reports table or database may be used to form a vocabulary for expanding the skill descriptions. For example, word vectors may be generated for all unique words in the incident reports (or all unique words appearing in selected fields of the incident reports table, for example). Thus, these words may be projected into a q-dimensional semantic space.

In yet another alternative or additional embodiment, an enterprise's computational instance may contain other tables and/or databases containing textual information related to IT operations. These may include, but are not limited to, online chat records, problem repositories, knowledgebase articles, software asset management data, and so on. Words in any one or more of these tables and/or databases may be used to form a vocabulary for expanding the skills descriptions. For example, word vectors may be generated for all unique words in online chat records and knowledgebase articles. Thus, these words may be projected into a q-dimensional semantic space.

Notably, the value of q for each of the q-dimensional semantic spaces discussed in this section may be different. This variable is overloaded for sake of convenience.

Regardless of how it is generated, an expanded vocabulary can be used as follows. For a word in the skill description, its vector may be found in the semantic space of the vocabulary. Then, a cosine similarity or Euclidian distance could be calculated between this vector and all or some of the other words in the vocabulary to determine a list of words with at least a threshold similarity (e.g., the cosine similarity or Euclidian distance is below a particular value). Some number of these similar words (e.g., all similar words or the m most-similar words) may be added to the skill description. This process could be repeated for each word in each skill description. Doing this expansion may result in more accurate skill recommendations for incident reports.

With expansion using incident report data, the skill description is also modified. The words "contractor", "starter", "termination", "hire", and "joiner", were found to be similar to "employee". The words "onboarding", "hire", "termination", and "contractor", were found to be similar to "offboarding".

With expansion using computational instance data, the skill description is further modified. The words "benefits", "payroll", "documents", "onboarding", and "beneficiary", were found to be similar to "employee". The words "onboarding", "hire", and "employment", were found to be similar to "offboarding".

The second skill description is "SSO". This is an acronym for "single sign-on" and is a term of art in the IT field. Thus, the general vocabulary provides no words similar to SSO. But, the incident report data and the computational instance data do provide a number of similar words.

D. Example Operations

FIG. 12D is a flow chart illustrating an example embodiment. The process illustrated by FIG. 12D may be carried out by a computing device, such as computing device 100, and/or a cluster of computing devices, such as server cluster 200, perhaps in the context of a computational instance. However, the process can be carried out by other types of devices or device subsystems. For example, the process could be carried out by a portable computer, such as a laptop or a tablet device.

Block 1250 may involve determining mappings (i) from text-based fields for each of a plurality of incident reports to incident vectors in a p-dimensional semantic space, and (ii) from text-based descriptions for each of a plurality of skill definitions to skill vectors in the p-dimensional semantic

TABLE 1

| Skill Description | No Expansion | Expanded with General Vocabulary | Expanded with Incident Report Data | Expanded with Computational Instance Data |
|---|---|---|---|---|
| employee offboarding | employee offboarding | employee offboarding worker customer officer staff job paid contractor | employee offboarding contractor starter termination hire joiner onboarding hire termination contractor | employee offboarding benefits payroll documents onboarding beneficiary onboarding hire employment |
| SSO | SSO | SSO | SSO sign signon logout provider authentication | SSO LDAP multifactor Kerberos federated logout data |

To illustrate further, Table 1 shows the skill description expansion for a number of scenarios. Two skill descriptions are represented in respective rows and the results of several different expansions are compared to the no expansion case for each.

The first skill description is "employee offboarding". With no expansion it remains as is. In each expansion, un-italicized words have been found to be similar to the un-italicized word "employee" and italicized words have been found to be similar to the italicized word "offboarding". Thus, words that are similar to both may be shown in the expansions for purposes of illustration, but would likely be removed in practice in order to eliminate redundancy.

With expansion using a general vocabulary, the skill description is modified to include the words "worker", "customer", "officer", "staff", "job", "paid", and "contractor". All of these words were found to be similar to "employee". No words similar to "offboarding" were found, likely due to that word's domain-specific context.

space, wherein the text-based fields document technology-related problems experienced by users of a managed network, and wherein the text-based descriptions are of skills that can be used to address at least some of the technology-related problems.

Block 1252 may involve performing a comparison, using a similarity metric, of the incident vectors to the skill vectors.

Block 1254 may involve, based on the comparison, identifying, for each of the incident reports, a set of the skill definitions that are most similar thereto.

Block 1256 may involve providing, for each respective incident report of the incident reports, the set of the skill definitions that are most similar thereto as recommended skills that can be used to address the technology-related problems documented in the respective incident report.

Some embodiments may further involve: (i) receiving, from a user and for a particular incident report, selection of one or more of the skill definitions that are most similar to the particular incident report; and (ii) storing, in the database and associated with the particular incident report, the one or more of the skill definitions as selected.

Some embodiments may further involve: (i) obtaining a further incident report that is not in the plurality of incident reports; (ii) determining a further mapping from the text-based fields of the further incident report to a further incident vector in the p-dimensional semantic space; (iii) performing a further comparison, using the similarity metric, of the further incident vector to the skill vectors; (iv) possibly based on the further comparison, identifying a further set of the skill definitions that are most similar to the further incident report; and (v) routing the further incident report for handling by an agent associated with at least one of the further set of the skill definitions.

Some embodiments may further involve, prior to determining the mappings, calculating a degree of overlap between a first set of words in the text-based fields for each of the incident reports and a second set of words in the text-based descriptions for each of the skill definitions. The degree of overlap may be based on a Jaccard coefficient calculated over the first set of words and the second set of words.

Some embodiments may further involve, prior to determining the mappings, determining that the degree of overlap exceeds a pre-determined threshold, and wherein determining the mappings occurs in response to the degree of overlap exceeding the pre-determined threshold.

Some embodiments may further involve, prior to determining the mappings: (i) determining that the degree of overlap does not exceed a pre-determined threshold; (ii) determining vector representations for the text-based fields of the incident reports, wherein the vector representations define the incident reports in a q-dimensional semantic space; (iii) creating a plurality of clusters based on the vector representations, wherein each of the incident reports is assigned to one of the clusters, and wherein the clusters define regions of the q-dimensional semantic space; (iv) assigning textual descriptions to each of the clusters based on frequencies of words from the text-based fields of the incident reports therein; and (v) providing, as recommended skill definitions, the textual descriptions assigned to at least some of the clusters.

Some embodiments may further involve, prior to determining the mappings: (i) determining that the degree of overlap does not exceed a pre-determined threshold; (ii) determining vector representations for the text-based fields of the incident reports, wherein the vector representations define the incident reports in a q-dimensional semantic space; (iii) possibly based on a further similarity metric, identifying further vector representations of related words from a pre-defined vocabulary that have at least a threshold degree of similarity to at least one of the vector representations; and (iv) expanding the text-based descriptions of skills to include at least some of the related words.

In some embodiments, the plurality of incident reports is part of a larger set of incident reports. These embodiments may further involve, prior to determining the mappings: (i) determining that the degree of overlap does not exceed a pre-determined threshold; (ii) determining vector representations for the text-based fields of the incident reports, wherein the vector representations define the incident reports in a q-dimensional semantic space; (iii) possibly based on a further similarity metric, identifying further vector representations of related words that (a) are from one or more of the text-based fields of the larger set of incident reports, and (b) have at least a threshold degree of similarity to at least one of the vector representations; and (iv) expanding the text-based descriptions of skills to include at least some of the related words.

In some embodiments, the computational instance includes a further set of text-based records that are related to technology-related problems experienced by users of the managed network. These embodiments may further involve, prior to determining the mappings: (i) determining that the degree of overlap does not exceed a pre-determined threshold; (ii) determining vector representations for the text-based fields of the incident reports, wherein the vector representations define the incident reports in a q-dimensional semantic space; (iii) possibly based on a further similarity metric, identifying further vector representations of related words that (a) are from the further set of text-based records, and (b) have at least a threshold degree of similarity to at least one of the vector representations; and (iv) expanding the text-based descriptions of skills to include at least some of the related words.

The value of q for each of the q-dimensional spaces described above may be different. The same variable is overloaded for purposes of convenience.

In some embodiments, the further set of text-based records is from: a problem database that contains descriptions of common technology-related problems from the incident reports and resolutions thereto, a change request database that contains descriptions of requested technological modifications related to the managed network, or a knowledgebase that contains articles textually describing a subset of the technology-related problems.

In some embodiments, determining the mappings comprises: (i) generating the incident vectors as term frequency representations of words in the text-based fields; and (ii) generating the skill vectors as term frequency representations of words in the text-based descriptions.

In some embodiments, generating the incident vectors and the skill vectors comprises: (i) concatenating the text-based fields and the text-based descriptions into a corpus of text; (ii) generating, based on the corpus of text, the term frequency representations of the words in the text-based fields; and (iii) generating, based on the corpus of text, the term frequency representations of the words in the text-based descriptions.

In some embodiments, determining the mappings comprises: (i) generating the incident vectors as paragraph vector representations of the text-based fields; and (ii) generating the skill vectors as paragraph vector representations of the text-based descriptions.

In some embodiments, using the similarity metric involves applying an inner product operation, a cosine similarity operation, or an intersection-over-union operation to the incident vectors and the skill vectors.

In some embodiments, for each respective incident report of the incident reports, the set of the skill definitions is a list of m skill definitions most similar to the respective incident report, wherein m is between 1 and 7 inclusive. Other ranges for m, such as between 1 and 3 inclusive, 1 and 5 inclusive, and 1 and 10 inclusive, are possible.

In some embodiments, for each respective incident report of the incident reports, the set of the skill definitions is a list of skill definitions for which similarity with the respective incident report exceeds a pre-defined similarity threshold.

In some embodiments, p is between 16 and 512. Other ranges are possible.

XII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computational instance of a remote network management platform comprising:
   a database containing a plurality of incident reports, wherein the incident reports include text-based fields that document technology-related problems experienced by users of a managed network, and wherein a subset of the incident reports have been determined to be members of a cluster based on a similarity metric applied to at least some of the text-based fields; and
   one or more processors configured to:
      create a corpus of text from one or more of the text-based fields in the subset of the incident reports in the cluster;
      preprocess the corpus of text by removing stop-words and punctuation;
      map words in the corpus of text to word stems, wherein one or more of the words in the corpus of text is mapped to each word stem;
      determine a set of word stems that appear most frequently in the corpus of text as mapped;
      determine a set of words respectively corresponding to the set of word stems, wherein each word of the set of words is a shortest word form of the words in the corpus of text that map to the respectively corresponding word stem; and
      generate a textual description of the cluster for approval or editing based on the set of words.

2. The computational instance of claim 1, wherein determining that the subset of the incident reports are members of the cluster comprises:
   determining vector representations for each of the subset of the incident reports, wherein the vector representations define the incident reports in a p-dimensional semantic space;
   calculating the similarity metric over the vector representations; and
   determining that the similarity metric indicates that all of the vector representations are located within a bounded region of the p-dimensional semantic space.

3. The computational instance of claim 2, wherein the similarity metric represents a distance in the p-dimensional semantic space between two of the vector representations.

4. The computational instance of claim 2, wherein the text-based fields include a short description, a problem description, and a resolution, and wherein the vector representations are determined from one or more of the short description, the problem description, or the resolution.

5. The computational instance of claim 1, wherein preprocessing the corpus of text also includes converting the corpus of text to lowercase and removing redundant whitespace.

6. The computational instance of claim 1, wherein a dictionary associates vocabulary words to respective vocabulary word stems, and wherein mapping the words in the corpus of text to word stems comprises looking up, in the dictionary, the words in the corpus of text to determine the word stems.

7. The computational instance of claim 1, wherein mapping the words in the corpus of text to word stems comprises removing suffixes from the words in the corpus of text, wherein the suffixes removed include 's', 'es', 'ed', 'ing', and 'ly'.

8. The computational instance of claim 1, wherein a first number of word stems in the set of word stems and wherein a second number of words in the set of words are each between 1 and 5 inclusive.

9. The computational instance of claim 1, wherein the shortest word form has a least number of letters of all word forms of the words in the corpus of text that map to the respectively corresponding word stem.

10. The computational instance of claim 1, wherein the one or more processors are configured to:
receive, from a device associated with a user, an approval of the textual description or an edited variation thereof; and
store, in the database and with the cluster, an indication of the textual description as approved.

11. The computational instance of claim 10, wherein the one or more processors are configured to:
receive a search query;
perform a comparison of the search query to the textual description as approved; and
based on the comparison, provide, as a result of the search query, references to one or more incident reports of the subset of the incident reports.

12. The computational instance of claim 1, wherein creating the corpus of text from one or more of the text-based fields in the subset of the incident reports in the cluster comprises creating the corpus of text by concatenating all instances of the one or more of the text-based fields in the subset of the incident reports in the cluster.

13. The computational instance of claim 1, wherein the one or more processors are configured to:
determine that the subset of the incident reports in the cluster has changed;
create a second corpus of text from the one or more of the text-based fields in the subset of the incident reports in the cluster;
preprocess the second corpus of text by removing stop-words and punctuation;
map words in the second corpus of text to the word stems, wherein one or more of the words in the second corpus of text is mapped to each word stem;
determine a second set of word stems that appear most frequently in the second corpus of text as mapped;
determine a second set of words respectively corresponding to the second set of word stems, wherein each word of the second set of words is a shortest word form of the words in the second corpus of text that map to the respectively corresponding word stem, and wherein the second set of words is different from the set of words; and
generate a second textual description of the cluster for approval or editing based on the second set of words.

14. A computer-implemented method comprising:
creating a corpus of text from one or more text-based fields in a subset of incident reports, wherein a database stores a plurality of incident reports, wherein the incident reports include text-based fields that document technology-related problems experienced by users of a managed network, and wherein the subset of the incident reports have been determined to be members of a cluster based on a similarity metric applied to at least some of the text-based fields;
preprocessing the corpus of text by removing stop-words and punctuation;
mapping words in the corpus of text to word stems, wherein one or more of the words in the corpus of text is mapped to each word stem;
determining a set of word stems that appear most frequently in the corpus of text as mapped;
determining a set of words respectively corresponding to the set of word stems, wherein each word of the set of words is a shortest word form of the words in the corpus of text that map to the respectively corresponding word stem; and
generating a textual description of the cluster for editing or approval based on the set of words.

15. The computer-implemented method of claim 14, wherein determining that the subset of the incident reports are members of the cluster comprises:
determining vector representations for each of the subset of the incident reports, wherein the vector representations define the incident reports in a p-dimensional semantic space;
calculating the similarity metric over the vector representations; and
determining that the similarity metric indicates that all of the vector representations are located within a bounded region of the p-dimensional semantic space.

16. The computer-implemented method of claim 14, wherein the shortest word form has a least number of letters of all word forms of the words in the corpus of text that map to the respectively corresponding word stem.

17. The computer-implemented method of claim 14, comprising:
receiving, from a device associated with a user, an approval of the textual description or an edited variation thereof; and
storing, in the database and with the cluster, an indication of the textual description as approved.

18. The computer-implemented method of claim 17, comprising:
receiving a search query;
performing a comparison of the search query to the textual description as approved; and
based on the comparison, providing, as a result of the search query, references to one or more of the subset of the incident reports.

19. An article of manufacture including a non-transitory computer-readable medium, having stored thereon program instructions that, upon execution by a computing device, cause the computing device to perform operations comprising:
creating a corpus of text from one or more text-based fields in a subset of incident reports, wherein a database stores a plurality of incident reports, wherein the incident reports include text-based fields that document technology-related problems experienced by users of a managed network, and wherein the subset of the incident reports have been determined to be members of a cluster based on a similarity metric applied to at least some of the text-based fields;
preprocessing the corpus of text by removing stop-words and punctuation;

mapping words in the corpus of text to word stems, wherein one or more of the words in the corpus of text is mapped to each word stem;

determining a set of word stems that appear most frequently in the corpus of text as mapped;

determining a set of words respectively corresponding to the set of word stems, wherein each word of the set of words is a shortest word form of the words in the corpus of text that map to the respectively corresponding word stem; and generating a textual description of the cluster for editing or approval based on the set of words.

20. The article of manufacture of claim 19, the operations comprising:

receiving, from a device associated with a user, an approval of the textual description or an edited variation thereof; and storing, in the database and with the cluster, an indication of the textual description as approved.

* * * * *